US012672181B2

(12) United States Patent (10) Patent No.: US 12,672,181 B2
Chun (45) Date of Patent: Jun. 30, 2026

(54) DIRECT COMMUNICATION

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 523 days.

(21) Appl. No.: 17/907,942

(22) PCT Filed: Mar. 4, 2021

(86) PCT No.: PCT/KR2021/002653
§ 371 (c)(1),
(2) Date: Aug. 29, 2022

(87) PCT Pub. No.: WO2021/177732
PCT Pub. Date: Sep. 10, 2021

(65) Prior Publication Data
US 2023/0109855 A1 Apr. 13, 2023

(30) Foreign Application Priority Data
Mar. 4, 2020 (KR) ........................ 10-2020-0027343

(51) Int. Cl.
*H04W 76/14* (2018.01)
*H04W 4/40* (2018.01)
*H04W 28/02* (2009.01)
(52) U.S. Cl.
CPC ............. *H04W 76/14* (2018.02); *H04W 4/40* (2018.02); *H04W 28/0263* (2013.01)

(58) Field of Classification Search
CPC ... H04W 76/14; H04W 4/40; H04W 28/0263; H04W 4/42; H04W 12/03; H04W 12/37; H04W 92/18
See application file for complete search history.

(56) References Cited

U.S. PATENT DOCUMENTS

| | | | | |
|---|---|---|---|---|
| 11,019,670 | B1 * | 5/2021 | Pan ........................ | H04W 76/14 |
| 11,589,254 | B2 * | 2/2023 | Pan ........................ | H04W 28/0263 |
| 2019/0028897 | A1 * | 1/2019 | Ying ..................... | H04W 12/63 |
| 2019/0090107 | A1 * | 3/2019 | Kim ..................... | H04W 76/11 |
| 2019/0215693 | A1 * | 7/2019 | Lee ........................ | H04L 63/205 |
| 2019/0223008 | A1 * | 7/2019 | Vanderveen ........ | H04W 12/041 |
| 2019/0230723 | A1 * | 7/2019 | Kim ..................... | H04W 76/12 |

(Continued)

FOREIGN PATENT DOCUMENTS

| | | | | |
|---|---|---|---|---|
| KR | 10-2019-0104010 A | | 9/2019 | |
| KR | 20250119667 A | * | 8/2025 | ............ H04W 76/14 |

OTHER PUBLICATIONS

Perras et al U.S. Appl. No. 62/824,001, filed Mar. 26, 2019 (Year: 2019).*

(Continued)

*Primary Examiner* — Wutchung Chu
(74) *Attorney, Agent, or Firm* — BRYAN CAVE LEIGHTON PAISNER LLP

(57) ABSTRACT

A disclosure of the present specification provides a method for performing direct communication by a first UE. The method may comprise the steps of: transmitting, to a second UE, a request message for establishing a unicast link; and receiving, from the second UE, a response message regarding the request message.

17 Claims, 14 Drawing Sheets

(56) References Cited

U.S. PATENT DOCUMENTS

| | | | | |
|---|---|---|---|---|
| 2019/0289462 A1* | 9/2019 | Kim | | H04W 8/20 |
| 2019/0335532 A1* | 10/2019 | Kim | | H04W 76/11 |
| 2020/0100088 A1* | 3/2020 | Kim | | H04W 48/16 |
| 2020/0145798 A1* | 5/2020 | Kim | | H04L 5/0091 |
| 2020/0221298 A1* | 7/2020 | Pan | | H04W 12/50 |
| 2020/0235946 A1* | 7/2020 | Lee | | H04L 9/3268 |
| 2021/0051473 A1* | 2/2021 | Escott | | H04W 12/106 |
| 2021/0105653 A1* | 4/2021 | Pan | | H04W 4/40 |
| 2021/0144727 A1* | 5/2021 | Pan | | H04W 4/40 |
| 2021/0258793 A1* | 8/2021 | Rohini | | H04W 76/14 |
| 2021/0410129 A1* | 12/2021 | Freda | | H04W 72/20 |
| 2022/0132307 A1* | 4/2022 | Perras | | H04W 4/40 |
| 2022/0174481 A1* | 6/2022 | Perras | | H04L 63/045 |
| 2022/0312242 A1* | 9/2022 | Kazmi | | H04W 36/037 |
| 2022/0330030 A1* | 10/2022 | Li | | H04W 12/03 |
| 2022/0377524 A1* | 11/2022 | Ferdi | | H04W 8/005 |
| 2023/0077297 A1* | 3/2023 | Fu | | H04W 4/40 |
| 2023/0389094 A1* | 11/2023 | Pan | | H04L 69/324 |
| 2024/0179531 A1* | 5/2024 | Rohini | | H04W 4/40 |

OTHER PUBLICATIONS

Rohini et al. Indian Provisional Application 202041006723 filed on Feb. 17, 2020 (Year: 2020).*

Pan et al. U.S. Appl. No. 62/934,738, filed Nov. 13, 2019 (Year: 2019).*

Qualcomm Incorporated, "Proposed text for security establishment clause of NR PC5 unicast security", S3-200347, 3GPP TSG-SA3 Meeting #98e, e-meeting, Mar. 2-6, 2020, see sections 5.3.3.1.4.2-5.3.3.1.4.3.

"3rd Generation Partnership Project; Technical Specification Group Core Network and Terminals; Vehicle-to-Everything (V2X) services in 5G System (5GS); Stage 3 (Release 16)", 3GPP TS 24.587 V1.0.1, (Dec. 2019), Dec. 10, 2019, see section 6.1.2.2.3.

Qualcomm Incorporated, "Proposed solution for the security policy of unicast connections", S3-200343, 3GPP TSG-SA3 Meeting #98e, e-meeting, Mar. 2-6, 2020, see section 3.

"3rd Generation Partnership Project; Technical Specification Group Services and System Aspects; Study on Security Aspects of 3GPP support for Advanced V2X Services (Release 16)", 3GPP TR 33.836 V0.4.0, (Oct. 2019), Oct. 30, 2019, see section 6.

* cited by examiner

Figure 3:
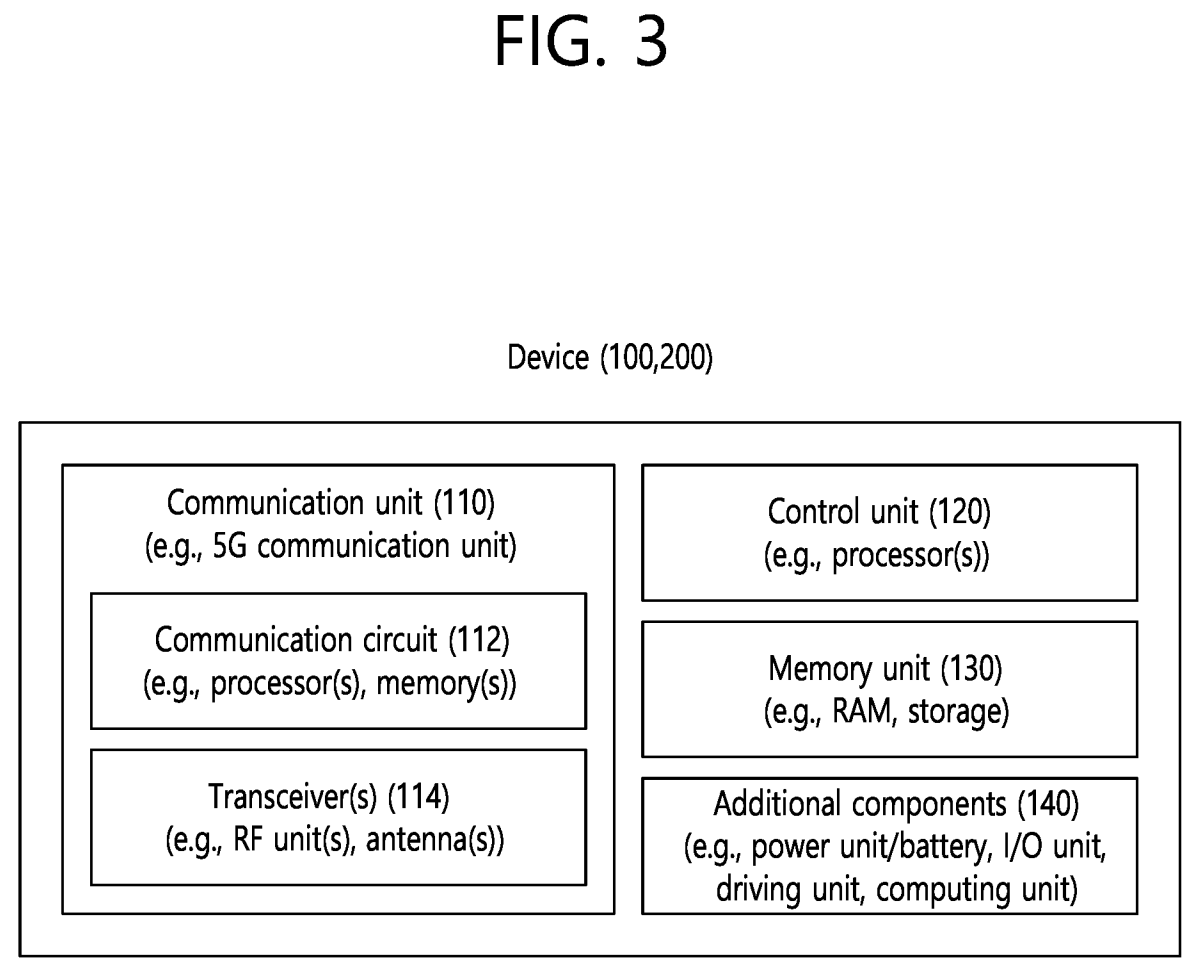

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

PC5-U

BS(e.g. eNB or gNB)

DIRECT COMMUNICATION

This application is the National Stage filing under 35 U.S.C. 371 of International Application No. PCT/KR2021/002653, filed on Mar. 4, 2021, which claims the benefit of and priority to Korean Application No. 10-2020-0027343, filed on Mar. 4, 2020, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) refers to a communication method in which a direct link is established between user equipments (UEs) and audio or data is directly exchanged by the UEs without a base station (BS). SL is considered as a method for solving the burden of a base station due to rapidly increasing data traffic.

V2X (vehicle-to-everything) refers to communication technology of exchanging information with other vehicles, pedestrians, and objects having infrastructure through wired/wireless communication. V2X can be classified into four types: vehicle-to-vehicle (V2V), vehicle-to-infrastructure (V2I), vehicle-to-network (V2N), and vehicle-to-pedestrian (V2P). V2X communication can be provided through a PC5 interface and/or a Uu interface.

On the other hand, a method for effectively applying security to the V2X (or SL) communication terminal has not been discussed. For example, for each of one or more V2X services, a security policy may be set. However, in V2X (or SL) communication, a method for effectively applying security to one or more V2X services in which a security policy is set has not been discussed.

SUMMARY

Accordingly, a disclosure of the present specification has been made in an effort to solve the aforementioned problem.

In order to solve the above problems, one disclosure of the present specification provides a method for a first UE to perform direct communication. The method includes: transmitting a request message for establishing a unicast link to a second UE; and receiving a response message to the request message from the second UE.

In order to solve the above problems, one disclosure of the present specification provides a first UE that performs direct communication. The first UE includes at least one processor; and at least one memory that stores an instruction and is operably electrically connectable with the at least one processor, wherein the operation performed based on the instruction being executed by the at least one processor comprises: a transmitting a request message for establishing a unicast link to a second UE; and receiving a response message to the request message from the second UE.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: generating a request message for establishing a unicast link to be transmitted to another device; and obtaining a response message to the request message from the other device.

In order to solve the above problems, one disclosure of the present specification provides a non-volatile computer-readable storage medium in which instructions are recorded. The instructions, when executed by one or more processors, cause the one or more processors to: generate a request message to establish a unicast link to be transmitted to another device; and obtaining a response message to the request message from the other device.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementation of the present disclosure is applied.

FIG. 2 shows an example of a wireless device to which implementation of the present disclosure is applied.

FIG. 3 shows an example of a wireless device to which implementation of the present disclosure is applied.

FIG. 6 shows a first example of a security establishment procedure to which the implementation of the present specification is applied.

FIG. 9 shows an example of a procedure according to the second disclosure of the present specification.

DESCRIPTION OF EXEMPLARY EMBODIMENTS

Figure 4A:
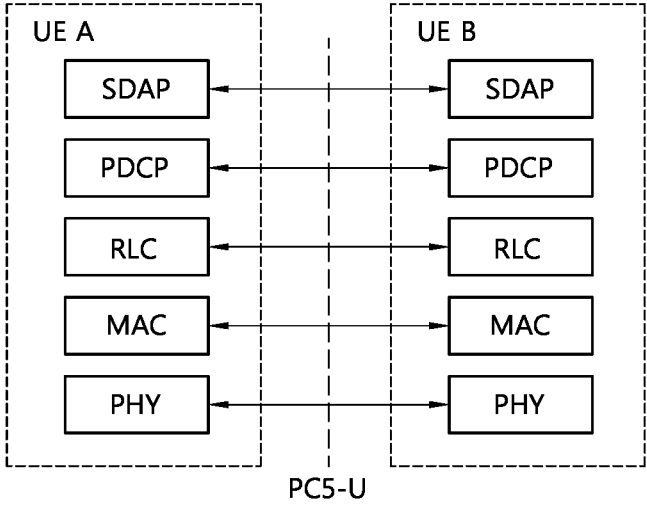
FIG. 4a and FIG. 4b show an example of a radio protocol architecture for SL communication to which implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although a user equipment (UE) is illustrated by way of example in the accompanying drawings, the illustrated UE may be referred to as a terminal, mobile equipment (ME), and the like. In addition, the UE may be a portable device such as a notebook computer, a mobile phone, a PDA, a smartphone, and a multimedia device or may be a non-portable device such as a PC or a vehicle-mounted device.

Hereinafter, a UE is used as an example of a wireless communication device (or a wireless device or wireless equipment) capable of wireless communication. An operation performed by a UE may be performed by a wireless communication device. A wireless communication device may also be referred to as a wireless device, wireless equipment, or the like. Hereinafter, AMF may mean an AMF node, SMF may mean an SMF node, and UPF may mean a UPF node.

A base station used below generally refers to a fixed station communicating with a wireless device and may also be referred to as an evolved-NodeB (eNodeB), an evolved-NodeB (eNB), a base transceiver system (BTS), an access point, and a next generation NodeB (gNB).

I. Techniques and Procedures Applicable to Present Disclosure

Figure 1:
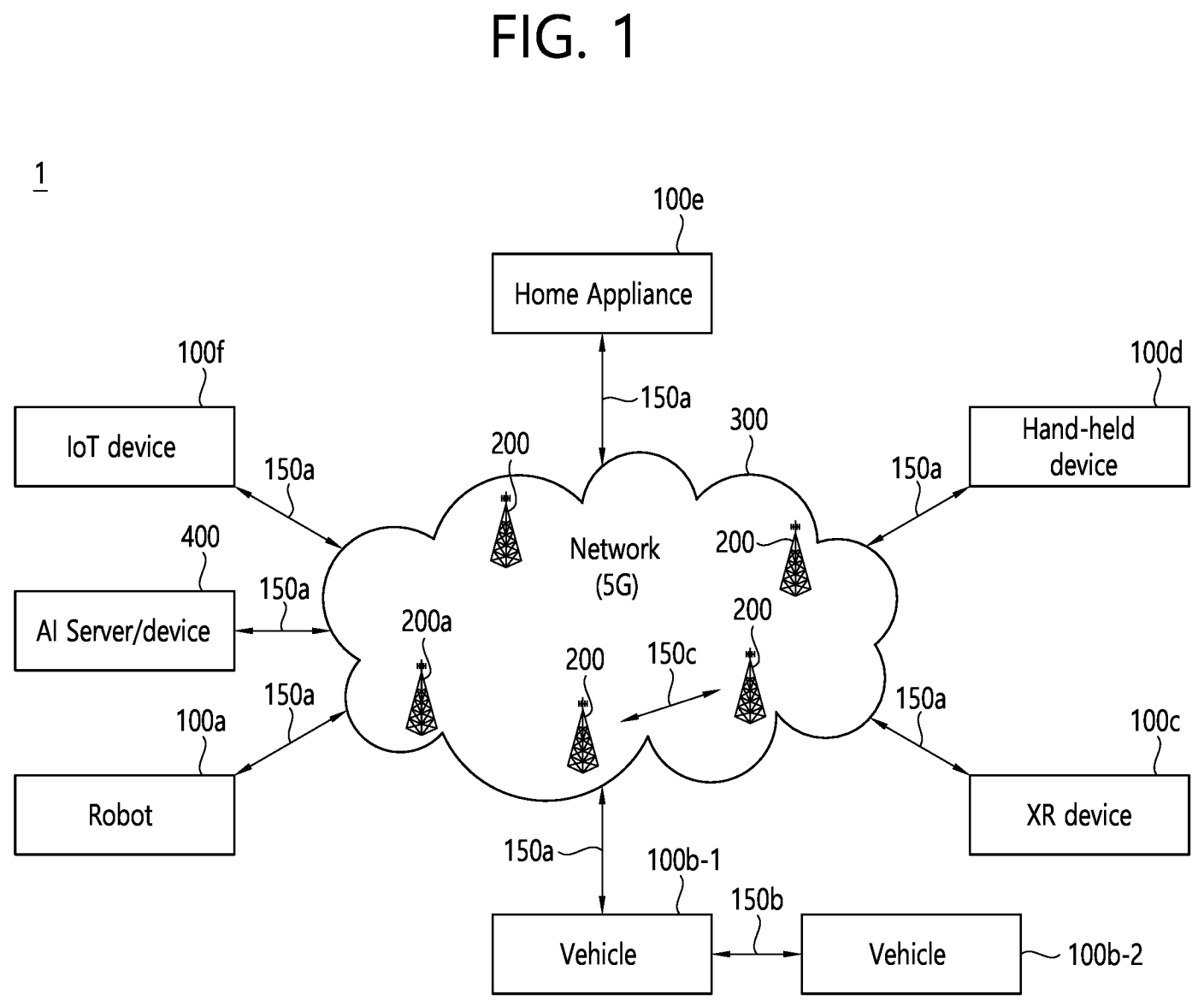

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world.

The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/ demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
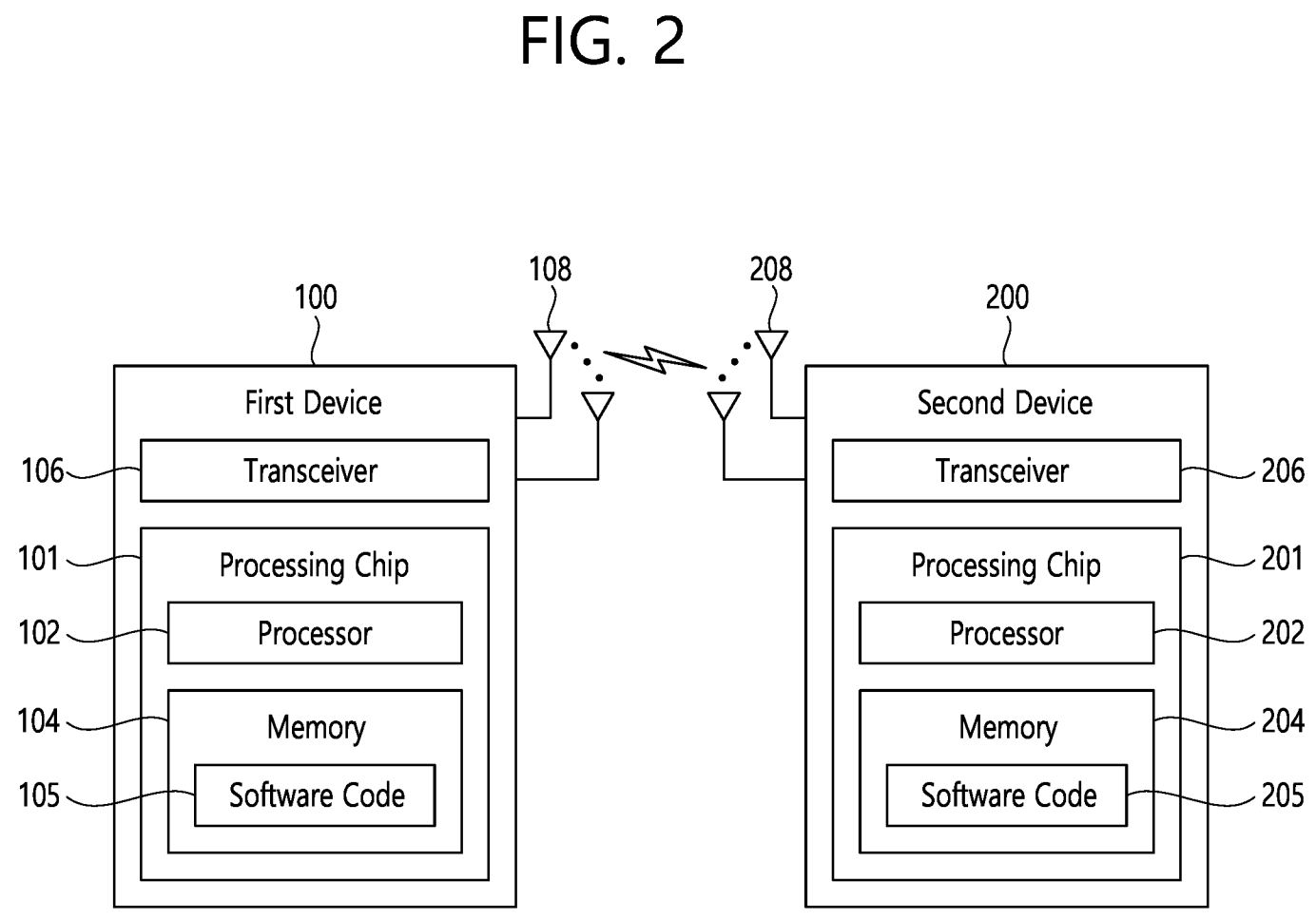

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/ signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Hereinafter, V2X or SL communication will be described.

Figure 4B:
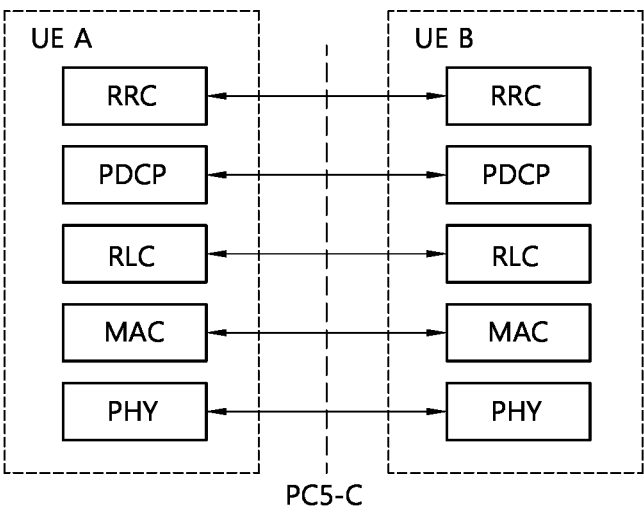

FIG. 4a and FIG. 4b show an example of a radio protocol architecture for SL communication to which implementation of the present disclosure is applied.

FIG. 4a and FIG. 4b show a radio protocol architecture for SL communication according to an embodiment of the present disclosure. The embodiment of FIG. 4a and FIG. 4b may be combined with various embodiments of the present disclosure. Specifically, FIG. 6a shows a user plane protocol stack and FIG. 6b shows a control plane protocol stack.

Hereinafter, a sidelink synchronization signal (SLSS) and synchronization information will be described.

The SLSS is an SL-specific sequence and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS and length-127 Gold sequences may be used for the S-SSS. For example, a UE may detect an initial signal using the S-PSS and may obtain synchronization. For example, the UE may acquire detailed synchronization using the S-PSS and the S-SSS and may detect a synchronization signal ID.

A physical sidelink broadcast channel (PSBCH) may be a (broadcast) channel through which basic (system) information that a UE needs to know first before transmission and reception of an SL signal is transmitted. For example, the basic information may be SLSS-related information, a duplex mode (DM), a time division duplex uplink/downlink (TDD UL/DL) configuration, resource pool related information, the type of an application related to SLSS, a subframe offset, broadcast information, and the like. For example, for evaluation of PSBCH performance, a payload size of the PSBCH may be 56 bits including a 24-bit CRC in NR V2X.

The S-PSS, S-SSS, and PSBCH may be included in a block format supporting periodic transmission (e.g., SL synchronization signal (SS)/PSBCH block, which may be included in a sidelink-synchronization signal block (S-SSB)). The S-SSB may have the same numerology (i.e., SCS and CP length) as a physical sidelink control channel (PSCCH)/physical sidelink shared channel (PSSCH) in a carrier, and a transmission bandwidth may be within a (pre)set sidelink BWP (SL BWP). For example, the bandwidth of the S-SSB may be 11 resource blocks (RBs). For example, the PSBCH may span 11 RBs. In addition, the frequency position of the S-SSB may be set (in advance). Therefore, the UE does not need to perform hypothesis detection in the frequency domain in order to discover the S-SSB in a carrier.

Figure 5:
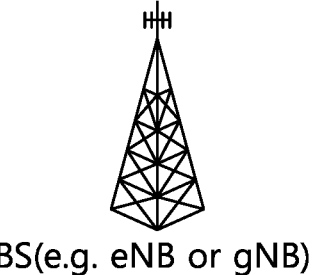
FIG. 5 shows an example of a UE performing V2X or SL communication to which implementation of the present disclosure is applied.
Figure 5:

FIG. 5 shows an example of a UE performing V2X or SL communication to which implementation of the disclosure is applied.

FIG. 5 shows a UE performing V2X or SL communication according to an embodiment of the present disclosure. The embodiment of FIG. 5 may be combined with various embodiments of the present disclosure.

Referring to FIG. 5, the term "UE" in V2X or SL communication may refer to a user's terminal. However, when network equipment such as a base station transmits and receives signals according to a communication method between UEs, the base station may also be regarded as a kind of UE. For example, UE 1 may be a first device 100 and UE 2 may be a second device 200.

For example, UE 1 may select a resource unit corresponding to a specific resource from a resource pool indicating a set of a series of resources. UE 1 may transmit an SL signal using the resource unit. For example, a resource pool in which UE 1 can transmit signals may be configured for UE 2, which is a receiving UE, and UE 2 may detect a signal of UE 1 in the resource pool.

Here, when UE 1 is within the coverage of a base station, the base station may inform UE 1 of the resource pool. On the other hand, when UE 1 is outside the coverage of the base station, another UE may inform UE 1 of the resource pool, or UE 1 may use a preset resource pool.

In general, a resource pool may be composed of a plurality of resource units, and each UE may select one or a plurality of resource units and use the same for SL signal transmission thereof.

<Security Policy>

Hereinafter, examples of security policies and how the UE processes the policies are described. For example, the security policy described below may be a PC5 security policy used when the UE performs V2X communication (or SL communication). There are two different cases in which an overall security context can be established. The two cases may be a case of setting up a new connection and a case of re-keying an ongoing connection. Each case will be described in detail in the example of FIG. 6 and the example of FIG. 7 below.

Hereinafter, an example of security policy handling will be described.

As part of the provisioning process for NR PC5 Unicast, the UE can be provisioned as follows. For example, the UE may handle the security policy by applying the following:

The UE may use a list of V2X services (eg, PSIDs or ITS-AIDs of V2X applications), geographic areas, and security policies of V2X services. The security policy of the V2X service may indicate the following:

Signalling integrity protection: ON(or REQUIRED)/ PREFERRED/OFF(or NOT NEEDED)

Signalling confidentiality protection: ON(or REQUIRED)/PREFERRED/OFF(or NOT NEEDED)

User plane integrity protection: ON(or REQUIRED)/ PREFERRED/OFF(or NOT NEEDED)

User plane confidentiality protection: ON(or REQUIRED)/PREFERRED/OFF(or NOT NEEDED)

For reference, if there is no integrity protection for traffic, services that do not require security may be activated.

For reference, when the signaling integrity security policy of at least one UE for the V2X service is set to REQUIRED, it can be ensured that only the connection to which the security is applied for the V2X service is used. To ensure security protection, it may be a good idea to set this security policy to REQUIRED.

For reference, some V2X applications are similar to emergency services, and security policy processing similar to emergency services may be required.

REQUIRED (or ON) may mean that the UE accepts the connection only when a non-NULL confidentiality or integrity algorithm is used for traffic protection.

NOT NEEDED (or OFF) may mean that the UE configures (or establishes) only a connection without security.

PREFERRED means that the UE may attempt to configure (or establish) security, but may also accept a connection without security. One use of PREFERRED is to allow security policy changes without updating all UEs at once.

Signaling integrity protection security policy OFF may mean that the UE may accept a connection without security, but the UE may attempt to configure (or establish) security. In a state in which the integrity protection security policy is set to ON, the UE may accept a connection only when a non-NULL integrity algorithm is used to protect signal traffic.

For other cases (e.g. Signaling confidentiality protection security policy, User plane confidentiality protection security policy, User plane confidentiality protection security policy), the NOT NEEDED (or OFF) setting may mean that the UE uses only the NULL confidentiality algorithm for the corresponding traffic, or that the UE does not apply integrity protection. And, REQUIRED (or ON) setting may mean that the UE must use a non-NULL algorithm (non-NULL algorithm). If the security policy is PREFERRED, the UE may accept all algorithms for specific protection. One use of PREFERRED is to allow security policy changes without updating all UEs at once.

For reference, for the following security policy, REQUIRED may be used in the same meaning as ON, NOT NEEDED can be used in the same meaning as OFF. That is, the description related to ON of the security policy may be equally applied to REQUIRED of the security policy. And, the description related to OFF of the security policy may be equally applied to NOT NEEDED of the security policy.

Upon initial connection, the UE may include a signaling security policy in a Direct Communication Request message. The UE may transmit a direct communication request message including the signaling security policy to another UE. A UE(s) responding to a direct communication request message considers the signaling security policy contained in the direct communication request message when selecting an algorithm in the Direct Security Mode Command message. The responding UE may transmit a direct security mode command message including an algorithm to an initiating UE (eg, a UE transmitting a direct communication request message). The initiating UE may reject the direct security mode command message if the algorithm selection does not match the security policy of the initiating UE.

When adding a V2X service to an existing connection, the UE may transmit a message requesting to add the V2X service to another UE. The UE responding to the request may reject the request if the signaling security in use does not match the security policy for the new application.

All UP (User Plane) data of the PC5 unicast link may have the same security (eg, security policy).

Handling of the user plane security policy may be performed in the following order in the example:

a) The UE that has transmitted the Direct Communications Request message upon initial connection may include the user plane security policy for the service in the Direct Security Mode Complete message.

b) If signaling confidentiality protection is not activated, the UE treats the user plane confidentiality policy for the V2X service for this connection as NOT NEEDED, the receiving UE may set confidentiality for the user plane to off. The receiving UE can accept the Direct Communication Request message, the receiving UE may include a setting (eg set to off) not to enable user plane confidentiality protection in the response message (eg Direct Communication Accept message).

c) The receiving UE may reject the Direct Communication Request message in the following cases: 1) If confidentiality/integrity is set to NOT NEEDED in the received user plane security policy and the user plane security policy of the receiving UE is set to REQUIRED or 2) if the received user plane security policy has confidentiality/integrity set to REQUIRED and the receiving UE's user plane security policy is set to NOT NEEDED.

d) Otherwise (eg, none of a) to c) above), the receiving UE may accept the Direct Communication Request message. And, the response message (eg, Direct Communication Accept message) transmitted by the receiving UE may include setting of user plane confidentiality protection based on the agreed user plane security policy. Here, the setting of user plane confidentiality protection may be set as in the following example:

1) if confidentiality is set to NOT NEEDED in the received user plane security policy and/or if the user plane security policy of the receiving UE for the service is set to NOT NEEDED, user plane confidentiality protection can be set to off; or 2) When confidentiality is set to REQUIRED in the received user plane security policy, or the user plane security policy of the receiving UE for the service is set to REQUIRED, user plane confidentiality protection can be set to on; or 3) If neither 1) or 2) above apply, user plane confidentiality protection may be set to off or on. For example, if confidentiality is set to PREFERRED in both the received user plane security policy and the user plane security policy of the receiving UE for the service, the user plane confidentiality protection may be set to off or on.

Hereinafter, an example of a security establishment (or establishment) procedure while a connection setup procedure is performed will be described with reference to FIG. 6.

Figure 6:
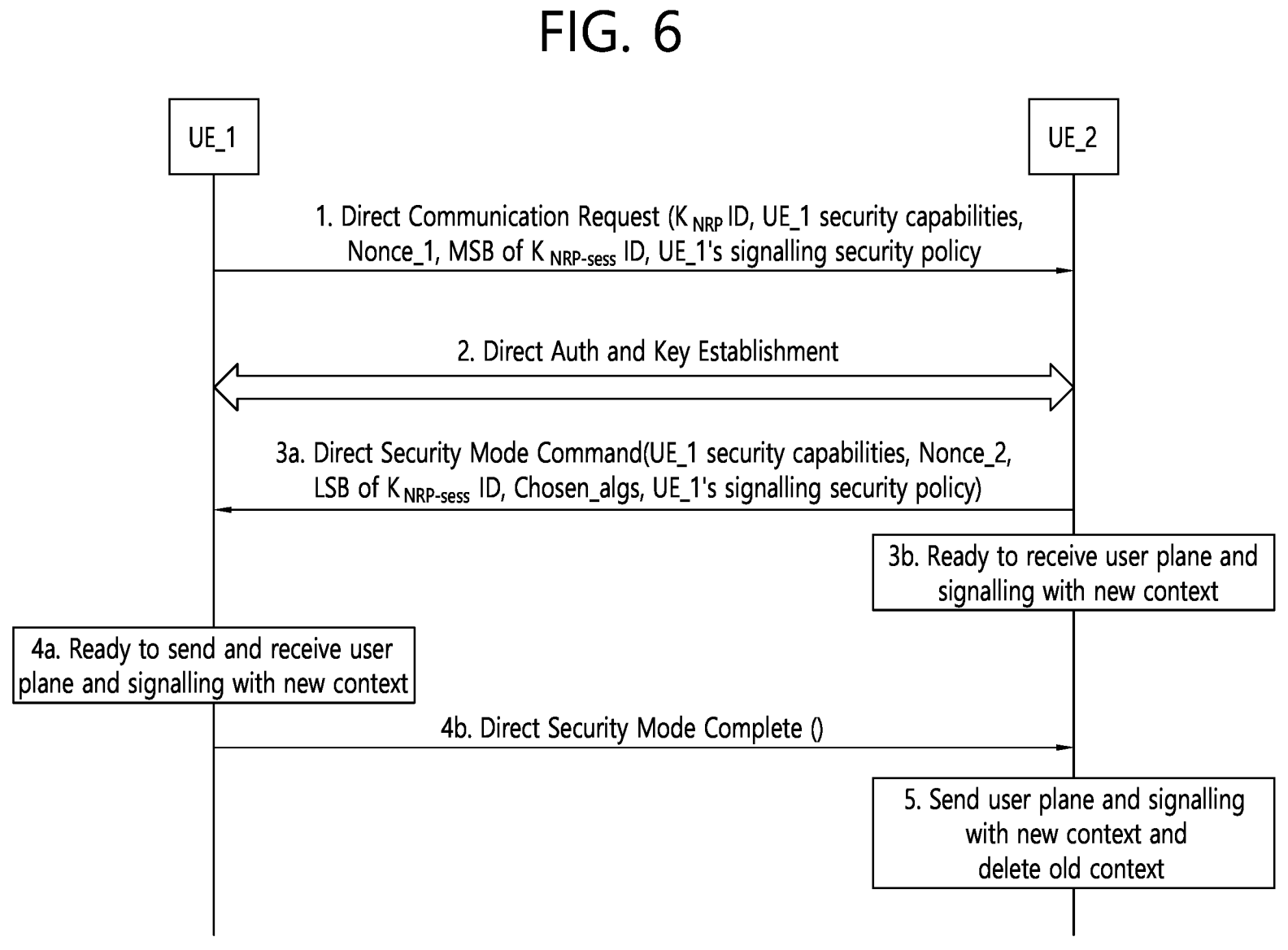

FIG. 6 shows a first example of a security establishment procedure to which the implementation of the present specification is applied.

The example of FIG. 6 describes an example of how security is configured (or established) during connection establishment.

1) UE_1 may directly transmit a communication request message to UE_2. The direct communication request message may include Nonce_1 (for generating session key $K_{NRP-sess}$ used for encryption and integrity check of data in each session, by using $K_{NRP}$), UE_1 security capabilities (e.g. list of algorithms that UE_1 will accept for this connection), signaling security policy of UE_1 and the most significant 8 bits of the $K_{NRP-sess}$ ID. In order for UE_1 to locally identify the security context created by the security establishment procedure, the most significant 8 bits of the $K_{NRP-sess}$ ID may be selected. If UE_1 has an existing $K_{NRP}$ for the UE attempting to communicate (eg, UE_2 in FIG. 6), the direct communication request message may also include a $K_{NRP}$ ID. Here, $K_{NRP}$ may be a master key for preventing eavesdropping from other terminals by a terminal pair that has established a unicast link. A $K_{NRP-sess}$ may be generated based on the $K_{NRP}$. No $K_{NRP}$ ID parameter indicates that UE_1 does not have a $K_{NRP}$ for UE_2. The direct communication request message may also include Key_Est_Info.

2) UE_2 may initiate a direct authentication (Direct Auth) procedure and a key configuration (or key establishment) procedure with UE_1. If UE_2 does not have the $K_{NRP}$ and $K_{NRP}$ ID pair indicated in step 1), the direct authentication procedure and key setting procedure can be performed essential, and signaling is required to set the key for a specific use case.

3a~3b) UE_2 may transmit a Direct Security Mode Command message to UE_1 (3a). The Direct Security Mode Command message may include Most Significant Bits (MSB), optionally Key_Est_Info of the KNRP ID, and optionally Key_Est_Info when a new KNRP is created. UE_2 may include Nonce_2 in the Direct Security Mode Command message to calculate the session key, UE_2 may include a Chosen_algs parameter indicating a security algorithm to be used by UEs to protect data in the message in the Direct Security Mode Command message. Chosen-algs may indicate the use of the NULL integrity algorithm only when the integrity of the signaling security policy of UE_2 is OFF. UE_2 may also provide protection against bidding down attacks by returning the security function of UE_1 and the signaling security policy of UE_1 to UE_1. UE_2 may also include the least significant 8 bits of the KNRP-sess ID in the Direct Security Mode Command message. This bit may be selected so that UE_2 can locally identify the security context created by the procedure according to the example of FIG. 6. UE_2 may calculate KNRP-Sess based on KNRP, Nonce_1 and Nonce_2, and then derive the confidentiality key and integrity key based on the selected algorithm. UE_2 may perform integrity protection before transmitting the direct security mode command message to UE_1. UE_2 may be ready to receive both signal and user plane traffic protected by the new security context (3b). UE_2 may form the KNRP-Sess ID from the most significant bit (MSB) received in the direct communication request message of step 1) and the least significant bit transmitted in the Direct Security Mode Command message.

4a~4b) When UE_1 receives the Direct Security Mode Command message, UE_1 can calculate $K_{NRP-sess}$, confidentiality key, and integrity key in the same way as UE_2. UE_1 may check whether the returned security function of UE_1 and signaling security policy of UE_1 are the same as those transmitted by UE_1 in the direct communication request message of step 1). UE_1 may also check the integrity protection of the message. UE_1 can accept the NULL integrity algorithm only if the security policy for the signal indicates that integrity protection is OFF. If all these tests (or checks) pass, UE_1 may be ready to send and receive signal and user plane traffic using the new security context (4a). UE_1 may transmit a Direct Security Mode Complete message to UE_2 with integrity protection and confidentiality protection (along with the selected algorithm which may be a Null algorithm) applied. UE_1 may form a $K_{NRP}$-sess ID based on the most significant bit transmitted in the direct communication request message in step 1) and the least significant bit received in the Direct Security Mode Command message in step 3).

5) UE_2 may check the integrity protection in the received Direct Security Mode Complete. If the verification of integrity protection passes, UE_2 can now be ready to transmit protected user plane data and control signals to the new security context. UE_2 may delete the old security context it had for UE_1.

Hereinafter, an example of a security establishment (or configuration) procedure during re-keying (re-input) will be described with reference to FIG. 7.

Figure 7:
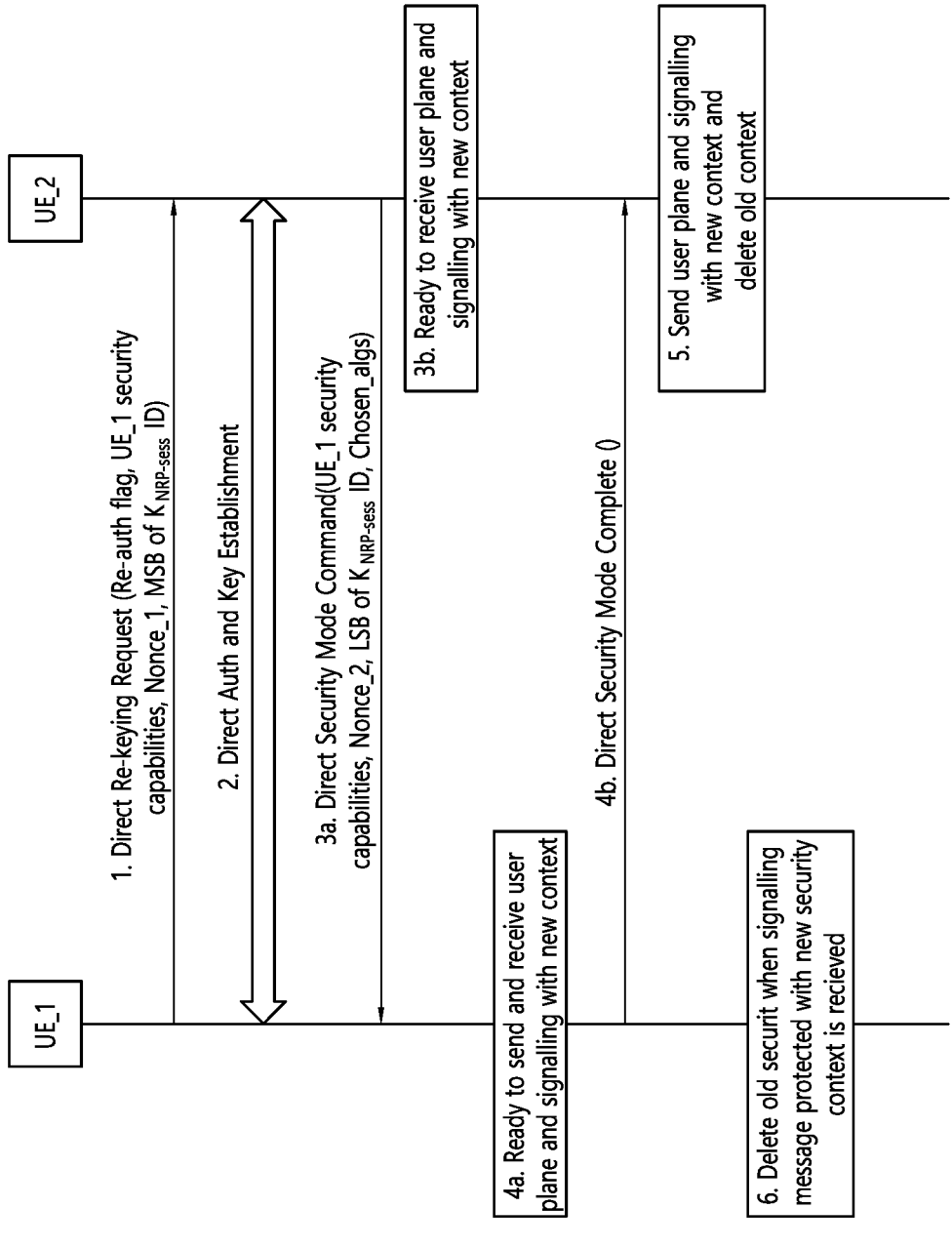
FIG. 7 shows a second example of a security establishment procedure to which the implementation of the present specification is applied.

FIG. 7 shows a second example of a security establishment procedure to which the implementation of the present specification is applied.

Through rekeying, the UE can check whether a new session key $K_{NRP}$-sess is used. Optionally, $K_{NRP-sess}$ may enforce $K_{NRP}$ refresh. Any one of the two UEs (eg, UE_1 and UE_2 in FIG. 7) may rekey the connection at any time. The rekey may have to be performed before the counter for the PDCP bearer is repeated with the current key. The rekeying operation may refresh $K_{NRP-sess}$ and NRPEK and NRPIK, and may refresh $K_{NRP}$.

An example of the rekeying operation will be described with reference to FIG. 7.

1) UE_1 may directly transmit a communication request message to UE_2. The direct communication request message may include Nonce_1 (for generating session key), UE_1 security capabilities (e.g. list of algorithms that UE_1 will accept for this connection), signaling security policy of UE_1 and the most significant 8 bits of the $K_{NRP-sess}$ ID. In order for UE_1 to locally identify the security context created by the security establishment procedure, the most significant 8 bits of the $K_{NRP}$-sess ID may be generating during rekeying procedure. If UE_1 tries to rekey $K_{NRP}$, Direct Re-Keying Request messages may include re-auth flags. The Direct Re-keying Request message may also include Key_Est_Info.

2) UE_2 may initiate a direct authentication (Direct Auth) procedure and a key establishment (or key establishment) procedure with UE_1. If the Direct Re-Keying Request message of the UE_1 includes a re-auth flag and a signaling is required to set the $K_{NRP}$, step 2) may be essentially performed.

3a~3b) It may be performed in the same way as step 3a) and step 3b) described in the example of FIG. 6. NULL integrity algorithm is currently in use, and if the signaling security policy of the UE_1 is not included in the Direct Security Mode Command message, step 3a) and 3b) of the example of FIG. 7 may be performed in the same way as step 3a) and step 3b) described in the example of FIG. 6, except that the selected integrity algorithm must be null.

4a to 4b) these steps may be performed in the same manner with steps 4a) and 4b) described in the example of FIG. 6. UE_1. Step 4a) and 4b) of the example of FIG. 7 may be performed in the same way as step 4a) and step 4b) described in the example of FIG. 6, except that UE_1 can accept the NULL integrity algorithm, only when the NULL integrity algorithm is currently in use and UE_1 does not check the returned signaling security policy.

5) this step may be performed in the same manner with Step 5) described in the example of FIG. 6.

6) When UE_1 receives an integrity protected message with a new security context, the UE_1 may delete the old security context stored for the UE_2.

Hereinafter, security establishment (or settings) for user plane bearers will be described.

When initial connection or V2X service is added, initiating UE may include user planar security policies respectively in the completion message of direct security mode or in link modification request. If the policy is not incompatible, another UE (e.g. UE to communicate with the initiating UE) may transmit user plane security policies for the V2X service in the direct communication acceptance message or link modification acceptance procedure. Cases in which the policy is not compatible, for example, may be a case in which the UE's policy may require confidentiality/integrity as OFF and other UE policies require ON status.

In order to input for the security algorithm, the UE initiating the establishment (or establishment) of the user plane bearer, may select the current key, NR PC5 Encryption Key (NRPEK) and NR PC5 Integrity Key (NRPIK) and Logical Channel ID (LCID) whose values associated with the bearer have not been used. If this selection is not possible, the UE must initiate the re-keying procedure described with reference to the example of FIG. 7 before establishing the user plane bearer.

When setting up a user plane bearer, the initiating UE may indicate the settings of confidentiality protection and integrity protection in the PC5-RRC message. Confidentiality protection algorithms and integrity protection algorithms can be the same as the algorithm selected to protect the signaling bearer.

The two UEs must guarantee that user plane bearer is required to transmit or receive user plane for each V2X service (for example, if it's received from a bearer with wrong security), only in the user plane bearer with a security.

II. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

The V2X service defined in LTE supported a Basic Safety message (BSM) or Cooperative Awareness Message (CAM) in which a vehicle simply informs other vehicles and its location/speed/direction. These messages were simply used primarily for the purpose of preventing collisions between vehicles. For example, considering the dynamic state of the vehicle, a message (eg, a message such as BSM, CAM, etc.) may be transmitted at a maximum cycle of 10 times per second. Also, these messages were transmitted based on communication between vehicles, with the vehicles not previously having a relationship with each other. Accordingly, the transmitted message is designed to be received by any vehicle in the vicinity of the vehicle. That is, in LTE V2X, only broadcast message delivery was supported. Therefore, the terminal performing LTE V2X communication (eg, the LTE V2X layer of the terminal) did not support a separate ciphering (encryption) or integrity protection function.

However, with the advent of the 5G era, support for various use cases other than the existing simple safety use cases (eg, BSM or CAM to prevent collisions) is also required for V2X services. For example, support of advanced services that can be used in various situations, such as a situation where two vehicles cross each other's driving paths in a high-speed vehicle driving situation, or a situation such as a group driving situation in which two or more vehicles move together on a fixed path became necessary. In 5G V2X, a plan to support services supporting these various use cases is being discussed.

For example, unlike the existing LTE V2X that supported only the broadcast method, 5G V2X supports not only a broadcast mode but also a unicast mode and a group cast mode.

In particular, in the above scenario (eg, a situation in which two vehicles cross a driving path or a group driving situation of two or more vehicles, etc.), when exchanging messages related to the V2X service, it is necessary to prevent the reception of messages from other vehicles not related to the V2X service. Because, if a message related to cross driving is exposed to other vehicles, a risk of hacking may occur, this is because accidents may occur. Therefore, strong security settings may be required for communication between two specific terminals and vehicles.

However, since each V2X service has different characteristics, the security policy for each different V2X service can be configured differently (eg, independently). In addition, even for the same V2X service, depending on the vehicle condition (eg size, type, purpose), other security policies may be applied. For example, even in the same group driving service, different security policies may be applied according to the state of the vehicle. For example, when a group driving service is used when police or the like perform security work, strong encryption (ie, a strong security policy) may be applied to prevent hacking. However, when a group driving service is used for a typical truck, and/or when the speed of the truck is low and the processing power of the communication device mounted on the truck is low, relatively weak security policy may be applied to only check integrity without encryption.

For reference, in the disclosure of the present specification, the meaning of the security policy of the V2X service is compatible and not compatible (incompatible) may be the same as the following example.

Assume a situation like the following example. The security policy of V2X service 1 may be set to ON (or REQUIRED), the security policy of V2X service 2 may be set to ON (or REQUIRED), the security policy of V2X service 3 may be set to PREFERRED, the security policy of V2X service 4 may be set to OFF (or NOT REQUIRED). For example, here, a security policy set to ON (or REQUIRED) may be compatible with a security policy set to ON (or REQUIRED) and a security policy set to PRE-FERRED. And, the security policy set to OFF (or NOT REQUIRED) may be compatible with the security policy set to ON (or REQUIRED) and the security policy set to PREFERRED. Among V2X service 1, V2X service 2, V2X service 3, and V2X service 4, a combination of compatible V2X service and incompatible V2X service is as an example as follows. A combination of compatible V2X services may be, for example, a combination of V2X service 1 and V2X service 2, a combination of V2X service 1 and V2X service 3, and a combination of V2X service 3 and V2X service 4. A combination of incompatible V2X services may be, for example, a combination of V2X service 1 and V2X service 4, V2X service 2, V2X service 3, and V2X service 4.

For reference, for the meaning of the security policy of the V2X service in the disclosure of this specification is compatible and not compatible, example c) in which the receiving UE rejecting Direct Communication Request message in description of <Security Policy> may also be referred. Here, c) is a description of <Security Policy> may be "c) The receiving UE may reject the Direct Communication Request message in the following cases: 1) If confidentiality/integrity is set to NOT NEEDED in the received user plane security policy and the user plane security policy of the receiving UE is set to REQUIRED or 2) if the received user plane security policy has confidentiality/integrity set to REQUIRED and the receiving UE's user plane security policy is set to NOT NEEDED".

For reference, in the disclosure of the present specification, V2X communication (or SL communication) means an example of direct communication between terminals. Thus, the description of V2X communication in the disclosure of the present specification can be applied to direct communication directly.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 8:
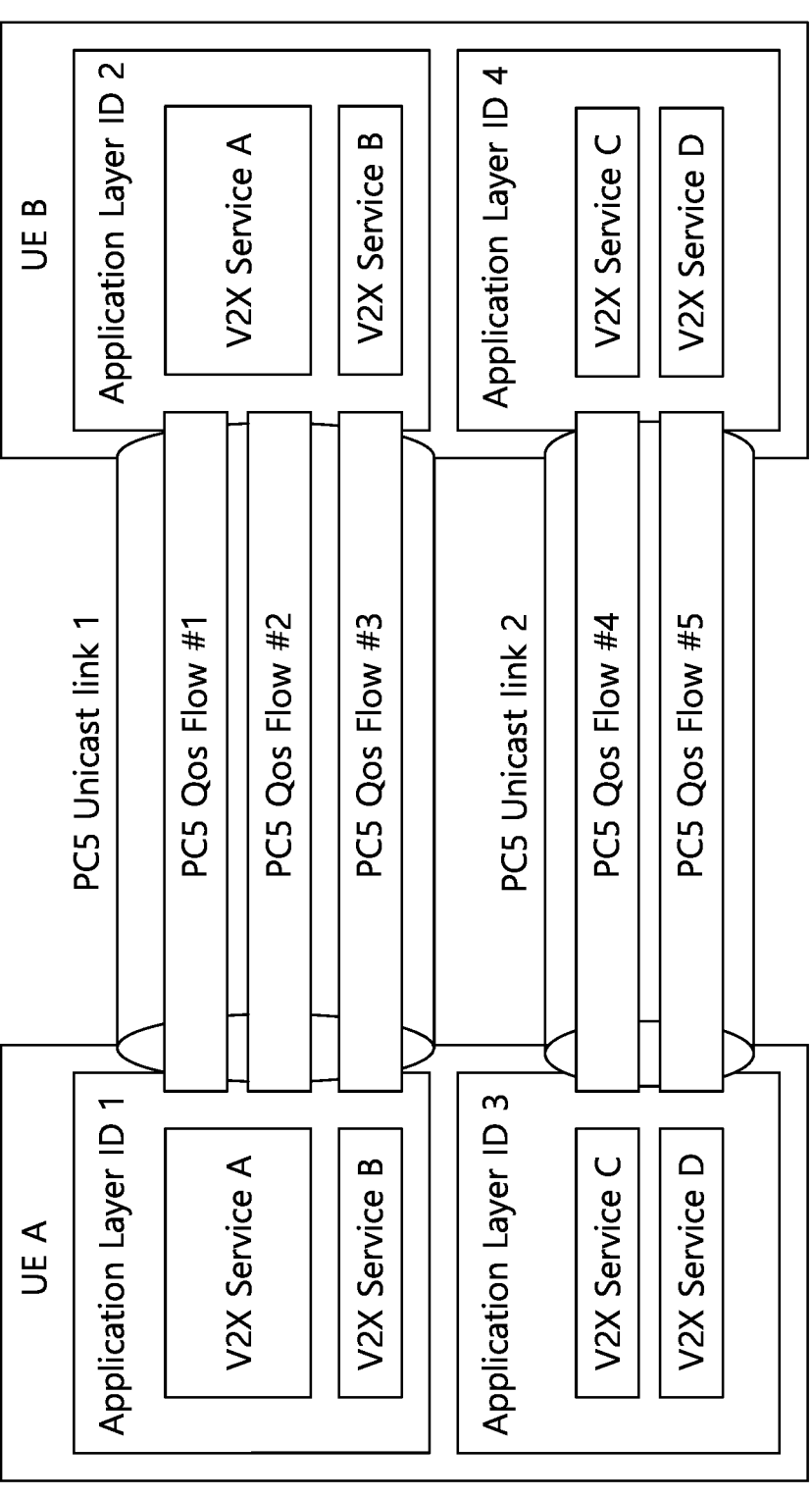
FIG. 8 shows an example of a hierarchical structure of UEs performing V2X communication in the disclosure of the present specification.

FIG. 8 shows an example of a hierarchical structure of UEs performing V2X communication in the disclosure of the present specification.

Meanwhile, referring to FIG. 8, the V2X layer of UEs performing V2X communication may be divided into a V2X application layer and a V2X service layer. Here, the V2X service layer may mean each rectangle indicated by V2X service A, B, C, and D in the example of FIG. 8. For example, in the example of FIG. 8, UE A may include an application layer corresponding to application layer ID 1 and a V2X service layer A and a V2X service layer B included in the application layer. In addition, UE A may include an application layer corresponding to the application layer ID 3 and a V2X service layer C and a V2X service layer D included in the application layer. In the example of FIG. 8, UE B may include an application layer corresponding to the application layer ID 2 and a V2X service layer A and a V2X service layer B included in the application layer. In addition, UE B may include an application layer corresponding to the application layer ID 4 and a V2X service layer C and a V2X service layer D included in the application layer.

In the example of FIG. 8, two PC5 unicast links are established between UE A and UE B. Since the V2X layer of UEs performing V2X communication can be divided into a V2X application layer and a V2X service layer, various V2X services may be supported within one application. In addition, depending on the state of the vehicle, the same V2X application may be operated with a combination of different V2X services.

For example, if the V2X application is a collision avoidance application, V2X service 1 supported by this application may be a BSM service, V2X service 2 may be an image-based see-through service, V2X service 3 may be a Cooperative Perception Message service that transmits information on objects detected in its vicinity. For each vehicle, and for each purpose and/or performance of the vehicle, the same application may be operated as a combination of different V2X services. Therefore, the 5G V2X communication protocol must support security for V2X services with different security policies.

In order to input for the security algorithm, the UE initiating the establishment (or establishment) of the user plane bearer, may select the current key, NR PC5 Encryption Key (NRPEK) and NR PC5 Integrity Key (NRPIK) and Logical Channel ID (LCID) whose values associated with the bearer have not been used. If this selection is not possible, the UE must initiate the re-keying procedure described with reference to the example of FIG. 7 before establishing the user plane bearer.

Hereinafter, the disclosure of the present specification will be described in detail through various examples. The first to fifth disclosures of the present specification below may be performed independently of each other or may be performed in combination with each other.

1. First Disclosure of the Present Specification

Both terminals may perform a procedure for configuring (or establishing) a unicast PC5 link. Here, for UE 1 requesting the unicast link, a plurality of V2X services that will use the corresponding unicast PC5 link may exist. In this case, UE 1 may first select one V2X service from among a plurality of V2X services. UE 1 includes information about one selected V2X service in the request message (Example: DCR (Direct Communication Request, or Unicast Link Request, etc.)), and the UE 1 may transmit the request message to the UE 2 by including the V2X security policy for this V2X service.

And UE 2 may receive a request message including information on one V2X service and a V2X security policy from UE 1. For the V2X service included in the received DCR message, if the V2X security policy is included in the message, the UE 2 may examine the V2X security policy for the corresponding V2X service stored in the UE 2. When the stored V2X security policy and the V2X security policy of the received request message are compatible with each other, the UE 2 may perform an additional link setup procedure (eg, direct authentication procedure or security mode control procedure).

1-1. First Example of the First Disclosure of the Present Specification

In the above description, the DCR message is an example, and a message other than the DCR message may be used as a message for transmitting the V2X Security Policy.

For example, when UE 1 transmits a DCR message to UE 2, UE 1 may not transmit the DCR message by including a security policy in the DCR message to UE 2 first. Instead of UE 1 transmitting the security policy first, UE 2 which received a DCR message may transmit a message including a security policy for the requested V2X service (V2X service included in the DCR message) to UE 1. Thereafter, the UE 1 may transmit a message including its own security policy (eg, a security policy for the requested V2X service) to the UE 2.

For example, when UE 1 transmits a DCR message to UE 2, the UE 1 may not transmit security policy by including it in the DCR message to UE 2 first. Instead of transmitting the security policy first, UE 1 may receive a security mode control message or direct authentication message from UE 2 later. After receiving the security mode control or direct authentication message from the UE 2, the UE 1 may transmit its security policy information to UE 2.

For example, without connection with the process such as DCR or security mode control as in the example described above, when two terminals want to know the security policy of the other (other terminal) for any V2X service at any time, two terminals may transmit a security policy query message. For example, when UE 2 wants to know the security policy of UE 1, UE 2 may transmit a security policy query message to UE 1. When the terminal (eg, UE 1) wants to respond, or when the terminal (eg, UE 1) is adapted to transmit a response to the security policy query message, or in other cases, the terminal (eg, UE 1) that has received the security policy query message, may transmit a security policy for V2X service, etc, included in the corresponding query message to the counterpart (eg, UE 2). The action of transmitting the security policy query message and the action of responding to the transmission of the security policy query message may be performed only after the two terminals have passed through each other's authentication procedure. If the procedure of exchanging information between two terminals is set separately for the security policy, at the time when a bearer is actually needed for V2X service, the two terminals may check each other's security policy.

1-2. Second Example of the First Disclosure of the Present Specification

As mentioned above, both terminals may configure (or establish) a unicast PC5 link for one V2X service first, through the DCR process (eg, the operation of transmitting a DCR message, etc.), DSM (direct security mode) process, DA (Direct authentication) process, etc, as mentioned above. Thereafter, the two terminals may additionally establish a connection for an additional V2X service on the corresponding unicast PC5 link. In this case, the terminals may perform the following operations.

For reference, the operations described below may be performed by both terminals, for convenience of description, it is assumed that UE 1 additionally requests V2X service. That is, the scope of the disclosure of the present specification is not limited by the content described below, in the following description, the operation performed by the UE 1 may be performed by the UE 2.

UE 1 may start a DLM (Direct Link modification) procedure in order to add an additional V2X service to the configured unicast PC5 link. For example, in order to add an additional V2X service to the unicast PC5 link, UE 1 may transmit a DLM request message may be transmitted to the UE 2. In this process, the UE 1 may include information on the V2X service that it wants to additionally request in the DLM request message. In addition, UE 1 may additionally include security policy information for this V2X service in the DLM request message.

UE 2 may receive a DLM request message. UE 2 may check whether the UE 2 supports the V2X Service (V2X service corresponding to information about the V2X service included in the DLM request message) requested by the received DLM request message. And, the UE 2 may examine the Security Policy set for this V2X service, and may check whether the Security Policy of the UE 1 and secure policy of the UE 2 are compatible. If compatible, the UE 2 may continue to perform an additional link modification process. If it is not compatible, UE 2 can perform a Reject process for the Link Modification process.

If UE 1 received Link Modification Reject from UE 2, UE 1 may stop the Link Modification process, or the UE 1 may perform a process to release the unicast PC5 link with the UE 2. In this case, for the additional V2X service, UE 1 may inform the application of UE 1 that the link is not set due to the difference in Security Policy. Application may request the release of the unicast PC5 link, based on the fact that links are not set due to differences in secure policy. In this case, the UE 1 may perform a process for release the unicast PC5 link with the UE 2.

1-3. Third Example of the First Disclosure of the Present Specification

In the second example of the first disclosure of the present specification described above, the security policy applied when the unicast PC5 link is configured (or established) in the DCR process may satisfy the security policy of the V2X service added later. In this case, it may be unnecessary for the UE 1 to transmit the security policy to the UE 2 in the subsequent DLM process. Here, that the security policy applied when the unicast PC5 link is configured (or established) satisfies the security policy of the V2X service added later may mean the following example. For example, it may mean a case in which the security policy of the newly requested V2X service is the same as the security policy currently applied to the unicast PC5 link, or a case in which the security policy requirement of the newly requested V2X service (eg, the condition required for security) is weaker than that of the security policy currently applied to the unicast PC5 link, or a case in which the security policy of the newly requested V2X service is compatible with the security policy currently applied to the unicast PC5 link. In this case, UE 1 may not transmit a security policy for a new V2X service to UE 2 in the DLM process. However, if the security policy of the newly requested V2X service is different from the security policy currently applied in the unicast PC5 link, or, if the security policy requirement of the newly requested V2X service (eg, the condition required for security) is stronger than the security policy requirement currently applied to the unicast PC5 link, or, if the security policy of the newly requested V2X service is not compatible with the security policy currently applied to the unicast PC5 link, UE 1 may transmit a message including a security policy for a new V2X service to UE 2 in the DLM process.

According to the example described above, UE 2 may receive a DLM request from UE 1, and the DLM request may include a security policy. In this case, the UE 2 may examine the security policy stored in the UE 2 for the newly requested X2X service. Here, the security policy stored in the UE 2 may mean a security policy stored by the UE 2 for the same V2X service as the V2X service newly requested by the UE 1. In this process, UE 2 may first check whether the security policy of the V2X service (newly requested V2X service) stored in the UE 2 is compatible with the security policy applied to the current unicast PC5 link. In case of compatible (eg, compatible), UE 2 may check whether the V2X security policy notified of the newly requested V2X service by the UE 1 (eg, the security policy of UE 1 for the newly requested V2X service) and the security policy (eg, the security policy of UE 2 for the newly requested V2X service) corresponding to V2X service is compatible with each other. Thereafter, if the two security policies are compatible with each other, UE 2 may accept the DLM request. Otherwise (that is, if the two security policies are not compatible with each other), UE 2 may transmit a DLM rejection message including the reason (for example, information related to the reason indicating that two security policies are not compatible with each other) that it is not compatible to UE 1. In this case, information related to the reason may include information that the security policy of UE 1 and the security policy of UE 2 are different for the new V2X service and/or information that the security policy of the current V2X service (eg, the security policy applied to the current unicast PC5 link) and the security policy of the newly requested V2X service are different.

When the security policy of the V2X service newly requested by UE 1 and the security policy of the current X2X services using the unicast PC5 link (eg, V2X services using the currently established unicast PC5 link) are not compatible, an operation such as the following example may be performed:

1) UE 1 may release the currently set (or established) unicast PC5 Link, and notify the application that the unicast PC5 Link is released. After that, the application may check the security policy for necessary V2X services, etc. For reference, the necessary V2X service required may be set by application producers for each application. For example, if we consider the collision avoidance application of a vehicle as an example, the collision avoidance application may use a basic safety message (BSM) transmission service in which each vehicle informs its location, or a CAM (Cooperative awareness message) service that each vehicle transmits information detected by its own sensor, or a video-sharing service that each vehicle transmits its own video footage, or a combination of these. When an application tries to utilize a plurality of services among these services, the application may check and select services with compatible security policy and security settings. After the check is performed, the application may classify the V2X services into a set including V2X services compatible with each other. And, the application configures (or establishes) a plurality of different unicast PC5 links, the application may request that only compatible V2X services be configured for each unicast PC5 link (eg, it may request the PC5-S entity).

In this process, the V2X layer may deliver the security policy information set for each V2X service to the V2X application.

In this process, the V2X layer may inform the V2X application why the addition of the V2X service failed. For example, the V2X layer may inform the V2X application that the addition of the V2X service has failed due to a compatibility problem with the V2X security policy.

In this process, the V2X layer may inform the application layer that a separate unicast PC5 link setup is required for the V2X service that has failed to be added.

2) UE 1 may check whether there is information on priority set for each V2X service. If there is information about priority, first, UE 1 may determine the V2X service having the highest priority. And, UE 1 may maintain the V2X service for a service compatible with the security policy of the V2X service having the highest priority and the security policy. In addition, UE 1 may not proceed with additional configuration (or establishment) for a V2X service having a security policy that is not compatible with the security policy of the V2X service having the highest priority. Or, if a V2X service having a security policy that is not compatible with the security policy of the V2X service with the highest priority is already configured (or established), UE 1 may start the release process for this V2X service. Accordingly, when the priority of the V2X service to be newly configured (or established) is the highest, based on the security policy of the V2X service to be newly configured (or established), UE 1 may determine whether the security policy is compatible. For example, for an existing V2X service that has a security policy that is not compatible with the security policy of the V2X service, UE 1 may perform the release process, or in the DLM process, UE 1 may simultaneously perform release for the existing V2X service.

3) UE 1 may not perform DLM for the new V2X service. For example, when the priority of the new V2X service is lower than the priority of the existing V2X service, DLM may not be performed.

1-4. Fourth Example of the First Disclosure of the Present Specification

A fourth example of the first disclosure of the present specification describes an example using the strongest security policy.

The strongest security policy is that of a specific security policy.

A certain terminal (eg, UE 1) may establish (or configure) a unicast PC5 link with another terminal (eg, UE 2). In this case, the terminal (eg, UE 1) may receive a list of V2X services that will use the corresponding unicast PC5 link from the application of UE 1. And, after checking the security policy for these V2X services, the terminal (eg, UE 1) selects the strongest one among the security policies, the UE may transmit the selected security policy to another UE (eg, UE 2) in the DCR process, DA process, or DSM process.

Here, the strong security policy may mean that the strength of the security requirement or the strength of the security guarantee of the security policy is strong.

As an example, Signaling integrity protection of V2X service 1 may be set to ON (or REQUIRED), Signaling integrity protection of V2X service 2 may be set to PREFERRED, Signaling integrity protection of V2X service 3 may be set to OFF (or NOT NEEDED). In this case, the security policy may be strong in the order of V2X service 1, V2X service 2, and V2X service 3. Specifically, in terms of security for data packets, V2X service 1 always requires security, so the security requirement is the strongest, since V2X Service 2 does not necessarily support security, the security requirements are moderate, since V2X service 3 does not set security, security requirements are the lowest.

As another example, policy information for V2X service may include a specific algorithm used for security setting (or establishment). For example, signaling integrity protection of V2X service 1, V2X service 2 and V2X service 3 may all be set to ON (or REQUIRED). And, for the security of V2X service 1, algorithm 1 (eg, 128-5G-IA1) and algorithm 2 (eg, 128-5G-IA2) may be set. For security of V2X service 2, algorithm 2 (eg, 128-5G-IA2) and algorithm 3 (eg, 128-5G-IA3) may be set. For security of V2X service 3, algorithm 4 (eg, 128-5G-IA4) may be set. Here, the strength of the algorithm's security guarantee may be stronger in the order of algorithms 1, 2, 3, and 4. Then, it can be said that the security requirements are strong and the strength of the security policy is strong in the order of V2X service 1, V2X service 2, and V2X service 3.

For the V2X services requested by the application, there may be V2X services whose security policy is not compatible with each other. In this case, the terminal (eg, UE 1) may reconfigure or reclassify the V2X service group so that the security policy includes compatible V2X services. In addition, the terminal (eg, UE 1) may perform a different unicast PC5 link configuration (or establishment) process for each V2X services (eg, V2X services included in the same V2X service group) compatible with each other security policy.

2. Second Disclosure of the Present Specification

The second disclosure of the present specification describes an example of an operation related to a security policy. For example, in the second disclosure of the present specification, an operation for inquiring a security policy, an operation for notifying the security policy, an operation for checking whether a change of the security policy is possible, and the like will be described.

In the second disclosure of the present specification, a process of inquiring a security policy for a configured (or established) unicast PC5 link may be performed. While the terminals are performing processes (or procedures) such as DCR, DLM, DA, DSM, or prior to initiating any such process (or procedure), an operation related to the security policy may be performed. Here, the operation related to the security policy is, for example, that each terminal informs the other party of its security policy for a certain V2X service, or that each terminal looks up the security policy (eg, the other party's security policy), or that each terminal performs an operation to determine whether the security policy can be changed.

For example, for a certain configured (or established) unicast PC5 link, each terminal may perform an operation as in the following example. In the following examples, it is assumed that UE 1 performs an operation as in the following example for convenience of explanation:

V2X service security policy Query: For certain V2X service, UE 1 may query UE 2, which is a counterpart UE, what security policy it has. For example, UE 1 may transmit a query message related to security policy to UE 2. UE 2 receiving the query, for the V2X service, may return information on the security policy (eg, the security policy of the UE 2 for a specific V2X service) stored in the UE 2 to UE 1. For a unicast PC5 link configured (or established), UE 1 may know whether or not to add the V2X service can be added based on the information on the security policy. For example, UE 1 may add the V2X service to the configured (or established) unicast PC5 link, based on the information about the security policy, only when the security policy of UE 1 and the security policy of UE 2 for the same V2X service are compatible. Only when the security policy of UE 1 and the security policy of the opposite UE 2 are compatible, UE 1 may start the process of adding the V2X service in the unicast PC5 link.

V2X service security policy notification: For the V2X service supported by the UE 1 and/or the V2X service that the UE 2 may be interested in, the UE 1 may deliver the security policy information set to the UE 1 to the UE 2. If necessary later, for V2X communication with the UE 1 in the unicast PC5 link, UE 2 may know which V2X service can be newly added based on the security policy information. For example, UE 2 may know that UE 2 can add a V2X service having a compatible security policy to the V2X service of UE 1 and a security policy for the V2X service to the unicast PC5 link, among the V2X services available to UE 2, based on the security policy information.

Unicast PC5 link security policy query: For the established (or established) unicast PC5 link, UE 1 may request information on how to change the security policy of the corresponding unicast PC5 link from UE 2. For example, UE 2 may check (or aggregate) V2X services mapped for the unicast PC5 link, or V2X services that are likely to be mapped in the future for the unicast PC5 link, among the available V2X services. For the checked (or aggregated) V2X services, UE 2 may configure (or generate) information about which security policy combinations are applicable. The UE 2 may return the configured (or generated) information to the UE 1.

Unicast PC5 link security policy notification: For V2X services mapped for the unicast PC5 link, or for the unicast PC5 link, UE 1 may check (or aggregate) V2X services that are likely to be mapped in the future. And, for the checked (or aggregated) V2X services, the UE 1 may configure (or create) information about which security policy combinations are applicable to them. The UE 1 may return the configured (or generated) information to the UE 2.

Based on the information used in the operation as in the above example and in the operation as in the above example, for the unicast PC5 link, each terminal may know whether any V2X services satisfy the security policy of the corresponding unicast PC5 link. Based on whether any V2X services satisfy the security policy of the unicast PC5 link, each terminal may determine whether to perform a process such as DLM.

Hereinafter, an example of a procedure to which the contents described in the second disclosure of the present specification are applied will be described with reference to FIG. 9.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
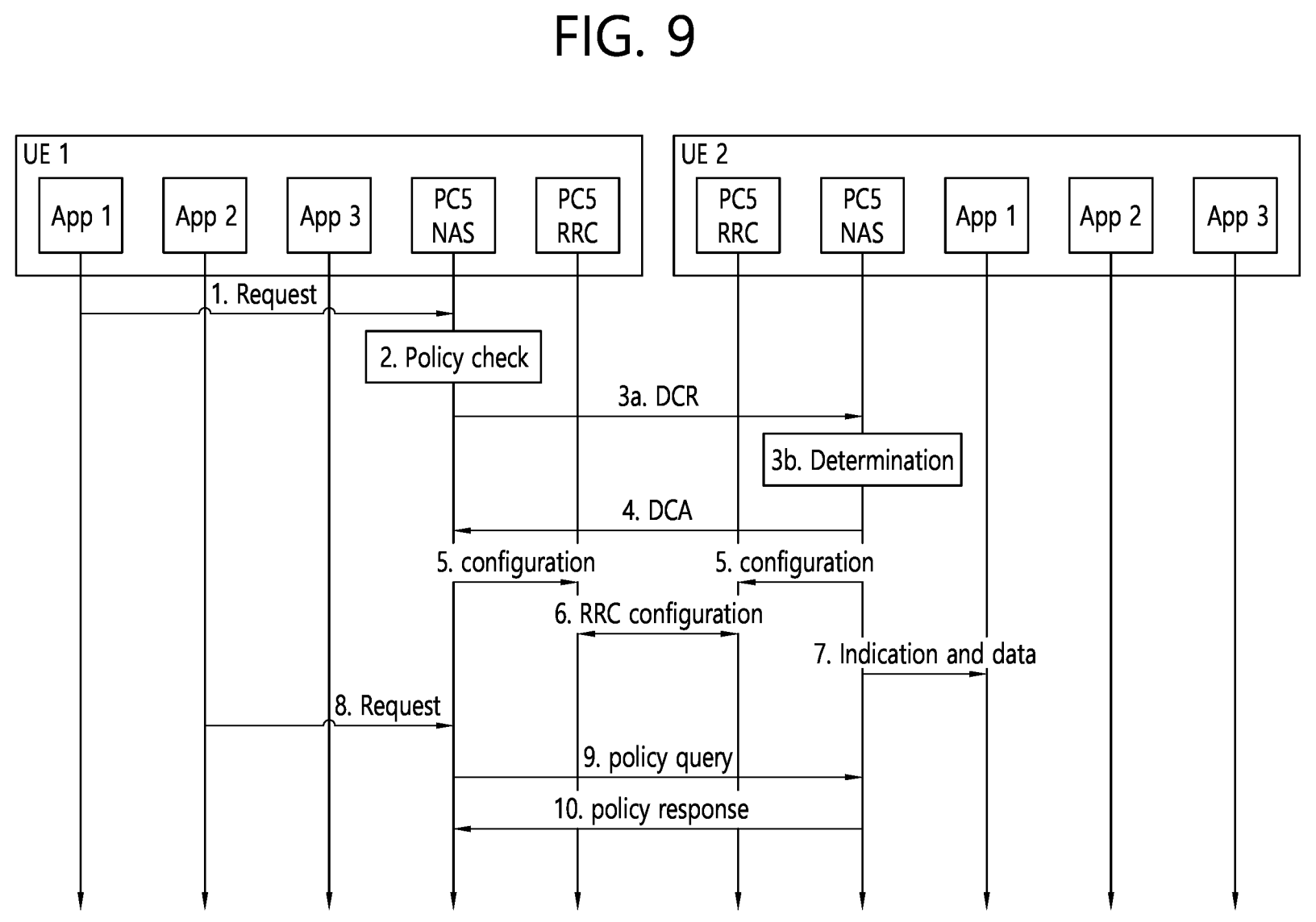

FIG. 9 shows an example of a procedure according to the second disclosure of the present specification.

The operations of UE 1 and UE 2 shown in the example of FIG. 9 are merely examples, and the scope of the disclosure is not limited thereto. UE 1 and UE 2 may perform the operation of the UE described in the disclosure of this specification, even if the operation is not shown in the example of FIG. 9.

In the example of FIG. 9, UE 1 may include an application layer. The application layer of UE 1 may include App 1 (Application 1), App 2, and App 3. UE 1 may include a plurality of application layers, and each of App 1, App 2, and App 3 may be included in a separate application layer. And each application may include one or more V2X services.

1) App 1 of UE 1 may start exchanging data with UE 2. To this end, the application layer of UE 1 may request a connection setup from the PC5 NAS layer.

2) The PC5 NAS layer of UE1 may check the QoS requirements and each security policy of App 1 that requested the connection.

3a~3b) The PC5 NAS layer of UE 1 may start setup of a new PC5 unicast link by transmitting a direct communication request (DCR) message to UE2. In this process, UE 1 may transmit the following information to UE 2 (eg, the DCR message may include one or more of the following information):

Information on which applications use the PC5 unicast link to be set (in the example of FIG. 9, information about App 1)

Information about the QoS requirements of App 1

Information about security policies of App 1

Upon receiving the DCR message from UE 1, UE 2 may determine the following based on information included in the DCR message (3b):

UE 2 may determine whether or not to configure a PC5 unicast link.

UE 2 may determine whether the security policy of UE 2 for App 1 and the security policy of UE 1 for App 1 match.

4) UE 2 may decide to set up a PC5 unicast link according to the determination of step 3b). In this case, UE 2 may configure and transmit a Direct Communication Accept (DCA) message to UE 1 according to the determination of step 3b).

5) The PC5 NAS layer of each of UE 1 and UE 2 may deliver the following information to the PC5 RRC layer of each of UE 1 and UE 2:

Information on which QoS flow to set

Information on the QoS requirements of each QoS flow

Information on whether security is applied to each QoS Flow and algorithm information related to security 6) Based on the information in step 5), the PC5-RRC layer of UE1 and the PC5-RRC layer of UE2 may start configuring the AS layer (eg, RRC configuration). In this process (eg RRC configuration procedure), the following decisions may be performed:

The PC5-RRC layer of UE1 and the PC5-RRC layer of UE2 may determine how many side link radio bearers (SLRBs) to configure.

The PC5-RRC layer of UE1 and the PC5-RRC layer of UE2 may determine how security is applied to each SLRB.

The PC5-RRC layer of UE1 and the PC5-RRC layer of UE2 may determine which QoS flow is mapped. In this case, only QoS flows compatible with security application (eg, application of security policy) may be mapped to the same SLRB. For example, if ciphering is on in QoS Flow 1, and ciphering is off in QoS Flow 2, even their the QoS requirements are the same, they can be mapped to different SLRBs, 7) Through the PC5-RRC process (eg RRC configuration), when the AS setting is finished, UE2 (PC5 NAS layer of UE2) may transmit information that connection setup (eg, RRC configuration) is completed to App2 of UE2. Through the PC5-RRC process (eg RRC configuration), when the AS setting is finished, App 1 of UE 1 and App 1 of UE2 may transmit and receive data to each other. The process in which UE 2 informs App 1 that the connection establishment with UE 1 has been completed (eg, step 7) may be performed at any point in the process during steps 1) to 6) are performed.

8) Thereafter, App2 may inform the PC5 NAS layer of UE 1 that it needs to connect with UE 2. For example, the application layer of UE 1 may request a connection setup from the PC5 NAS layer.

9) The PC5 NAS layer of UE 1 may first transmit a policy query message to find out what the security policy of App2 is to UE 2 in order to check whether App2 can use the current PC5 unicast link.

10) UE 2 may reply to UE 1 by including the security policy of UE 2 for APP2 in the policy response message. If UE 1's security policy for App 2 is compatible with UE 2's security policy, the UE 2 may start the procedure of adding App2 to the current PC5 unicast link.

3. Third Disclosure of the Present Specification

The third disclosure of the present specification describes an operation of changing a security policy for a configured (or established) unicast PC5 link.

For example, for a configured (or established) unicast PC5 link, each terminal may perform an operation as in the following example. In the following examples, it is assumed that UE 1 performs the same operations as in the following examples for convenience of description.

UE 1 may perform an operation of changing a security policy for the configured unicast PC5 link. For example, when UE 1 intends to additionally include a specific V2X service for the configured unicast PC5 link, or the UE 1 wants to change the security policy by the internal operation of UE 1, UE 1 may transmit a security policy update request message to UE 2. For example, in this case, the UE 1 may configure (or generate) a security policy update request message and transmit the security policy update request message to the UE 2. Here, the security policy update request message may include information about the specific V2X service that UE 1 intends to include and the security policy of this V2X service, and/or information about the security policy to be changed. Based on the information about the security policy included in the security policy update request message, for a case (eg, if the security policy of the V2X service of UE 2 is compatible with the security policy of UE 1) in which the UE 2 supports the security policy of the UE 1, the UE 2 may transmit an accept message to the UE 1.

4. Fourth Disclosure of the Present Specification

The fourth disclosure of the present specification describes an example of an operation related to a plurality of V2X services.

Two UEs (eg, UE 1 and UE 2) may perform a procedure for establishing (or establishing) a unicast PC5 link. For convenience of description, it is assumed that the terminal requesting the unicast link in the procedure of establishing (or establishing) the unicast PC5 link is UE1. For example, UE 1 may transmit a request message requesting configuration (or establishment) of a unicast PC5 link to UE 2 in a procedure for establishing (or establishing) a unicast PC5 link. In the procedure of establishing (or establishing) a unicast PC5 link, UE 1 requesting configuration (or establishment) of a unicast link may have a plurality of V2X services that will use the corresponding unicast PC5 link. If there are a plurality of V2X services that will use the unicast PC5 link, UE 1 may include information of all V2X services to be configured for the unicast PC5 link in the request message. In addition, if there are a plurality of V2X services that will use the corresponding unicast PC5 link, UE 1 may additionally include security policy information for each V2X service in the request message. That is, if there are a plurality of V2X services that will use the corresponding unicast PC5 link, UE 1 may transmit a request message (eg, a message requesting establishment (or establishment) of unicast PC5 link) including information of all V2X services to be configured for unicast PC5 link and security policy information for each V2X service to UE 2.

For each of the V2X services included in the received request message (eg DCR message), UE 2 may check whether the security policy is compliant or not by comparing the security policy of UE 1 with the V2X security policy that the UE 2 stores. The UE 2 may perform additional necessary procedures (eg, DA, DSM, and/or DCA related procedures, etc.) for configuration (or establishment) of a unicast PC5 link, for a V2X service compatible with security policy among V2X services included in the received request message (eg, DCR message). And, UE 2 among the V2X services included in the received request message (eg, DCR message), for a V2X service in which the security policy is not compatible, the UE 2 may notify UE 1 that configuration (or establishment) of a unicast PC5 link is impossible. In this case, the UE 2 may additionally inform the UE 1 that the security policy is not compatible.

The operation described in the fourth disclosure of the present specification may be performed in the DA/DSM/DCA process, instead of DCR, as in the example described in the first example of the first disclosure of this specification. In this case, instead of notifying UE 1 that the security policy is not compatible, UE 2 may deliver the security policy information it has for each V2X service to UE 1 in the DA/DSM/DCA process.

In response to the request message (eg, DCR message) sent by UE 1, UE 2 may transmit a Direct Communication Accept message to UE 1. UE 2, along with a list of V2X services accepted because the security policy is compatible, may include the V2X service list rejected by UE 2 because the security policy is not compatible in the Direct communication Accept message, the UE 2 deliver the Direct communication Accept message to UE 1. The UE 1 may use other messages such as Direct security mode complete.

In the description according to the example of the fourth disclosure of the present specification, UE 1 or UE 2 may receive a security policy for each V2X service from the counterpart. In this case, the terminal (UE 1 or UE 2) may compare and examine the security policy stored by the terminal for each V2X service and the security policy for each V2X service transmitted by the counterpart. The terminal (UE 1 or UE 2) may preferentially select V2X services (eg, the first V2X service group) having security policy being compatible with the security policy for each V2X service transmitted by the counterpart, among the V2X services it supports. And, the terminal (UE 1 or UE 2) may select V2X services (eg, a second V2X service group) having security policy being mutually compatible among these V2X services (eg, the first V2X service group). The terminal (UE 1 or UE 2) transmits information about these V2X services (eg, the second V2X service group) to the counterpart terminal, and may inform the counterpart terminal that a unicast PC5 link can be configured (or established). And, the terminal (UE 1 or UE 2) may inform the counterpart terminal that it is impossible to configure (or establish) a unicast PC5 link, because the other V2X services (eg, V2X services that are not compatible with each other among the first V2X service group, or V2X services that are not included in the second V2X service group among the first V2X service group) having the security policy that is not compatible.

In the rest of V2X service, it notifies that it cannot be set due to security policy incompatibility.

4-1. First Example of the Fourth Disclosure of the Present Specification

Hereinafter, a first example of the fourth disclosure of the present specification will be specifically described. The contents described in the first example of the fourth disclosure of the present specification may be applied to the contents described in the fourth disclosure of the present specification.

In the operation and process according to the contents described in the fourth disclosure of the present specification, Two UEs (eg, UE 1 and UE 2) may perform a procedure for establishing (or establishing) a unicast PC5 link. For convenience of description, it is assumed that the terminal requesting the unicast link in the procedure of establishing (or establishing) the unicast PC5 link is UE1. For example, UE 1 may transmit a request message requesting configuration (or establishment) of a unicast PC5 link to UE 2 in a procedure for establishing (or establishing) a unicast PC5 link. In the procedure of establishing (or establishing) a unicast PC5 link, UE 1 requesting configuration (or establishment) of a unicast link may have a plurality of V2X services that will use the corresponding unicast PC5 link. If there are a plurality of V2X services that will use the unicast PC5 link, UE 1 requesting configuration (or establishment) of a unicast link may transmit the request message to UE 2 by including only V2X services compatible with security policy in the request message (eg, a request message transmitted to UE 2). For example, the request message may include only information about V2X services compatible with each other's security policy among V2X services supported by UE 1. In other words, each of the security policies of the V2X services included in the request message transmitted by the UE 1 may be a mutually compatible security policy.

The operation described in the first example of the fourth disclosure of the present specification may be performed in the DA/DSM/DCA process, instead of DCR, as in the example described in the first example of the first disclosure of this specification. In this case, instead of notifying UE 1 that the security policy is not compatible, UE 2 may deliver the security policy information it has for each V2X service to UE 1 in the DA/DSM/DCA process.

In the operations and processes described in the first example of the fourth disclosure of the present specification, additionally, instead of transmitting a message including a security policy for each included V2X service to the other terminal, the terminal may transmit a message including only one strongest security policy to the counterpart terminal. For example, when the terminal transmits a message including information on a plurality of V2X services to the counterpart terminal, this message may include information on the strongest security policy among security policies of a plurality of V2X services or only one security policy set.

Hereinafter, an example of a procedure to which the contents described in the first example of the fourth disclosure of the present specification are applied with reference to FIG. 10 will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
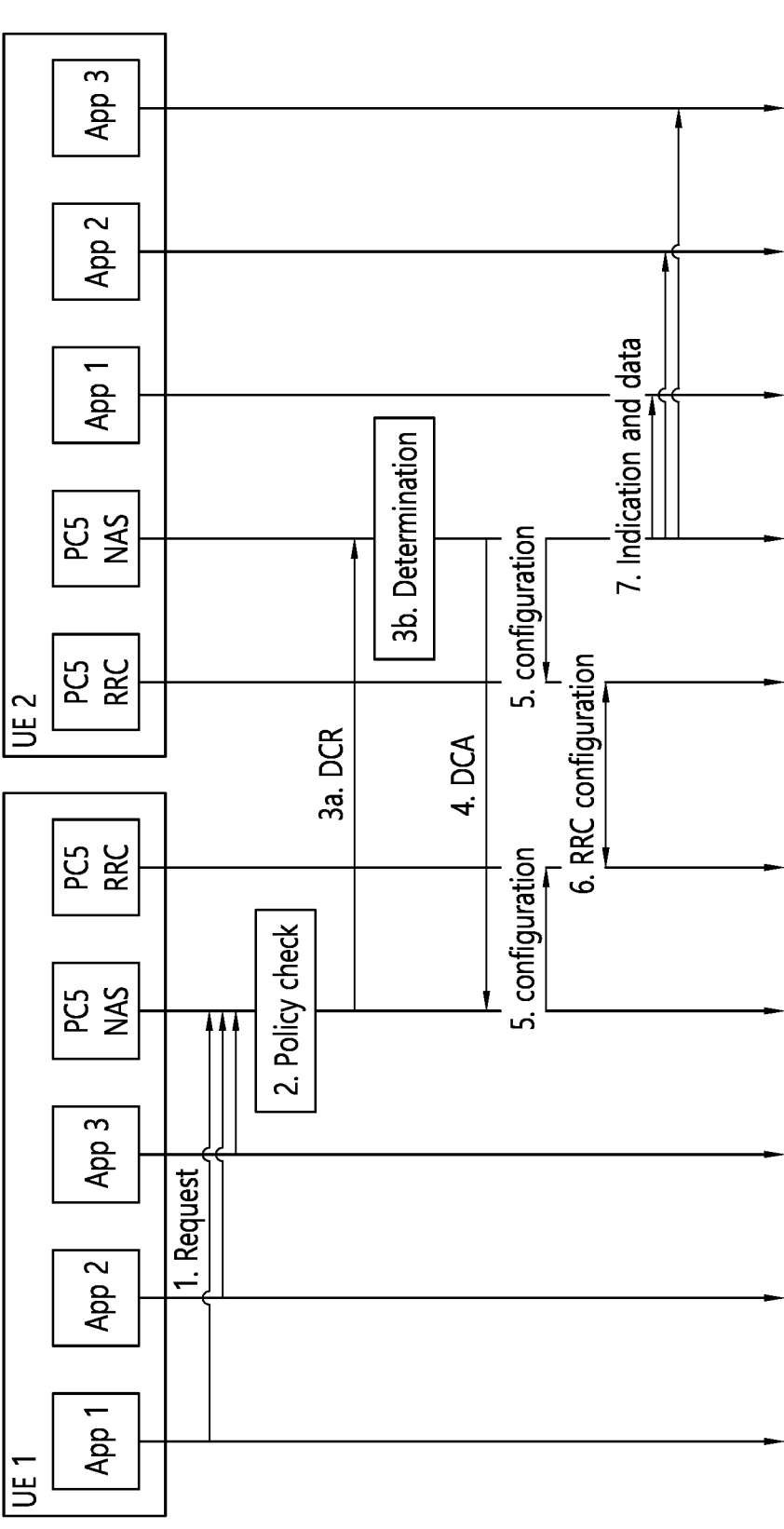
FIG. 10 shows an example of a procedure according to a first example of the fourth disclosure of the present specification.

FIG. 10 shows an example of a procedure according to a first example of the fourth disclosure of the present specification.

The operations of UE 1 and UE 2 shown in the example of FIG. 10 are merely examples, and the scope of the disclosure is not limited thereto. UE 1 and UE 2 may perform the operation of the UE described in the disclosure of this specification, even if the operation is not shown in the example of FIG. 10.

In the example of FIG. 10, UE 1 may include an application layer. The application layer of UE 1 may include App 1 (Application 1), App 2, and App 3. UE 1 may include a plurality of application layers, and each of App 1, App 2, and App 3 may be included in a separate application layer. And each application may include one or more V2X services.

1) In the application layer of UE 1, data exchange with UE 2 may be started. To this end, the application layer of UE 1 may request a connection setup from the PC5 NAS layer. The request message delivered by the application layer of UE 1 to the PC5 NAS layer may include information about each application's security policy. In the example of FIG. 10, simply, situation is assumed as App 1's security policy is configured to be Required (or ON), App 2's security policy is configured to be Preferred, the security policy of App 3 is configured to be Not Needed (or OFF).

2) The PC5 NAS layer of UE1 may check the QoS requirements of applications requesting connection and each security policy. In the process of UE1's PC5 NAS layer checking QoS requirements and security policy, UE1's PC5 NAS layer may classify compatible applications after examining each application's security requirements. For example, the PC5 NAS layer of UE1 may classify as App 1 and App 2 compatible, and App 2 and App 3 compatible. The PC5 NAS layer of UE1 may determine to transmit a communication request message directly to UE2 only for applications compatible with each other. For example, since the PC5 NAS layer of UE1 is compatible with App 1 and App 2, the PC5 NAS layer of UE 1 may decide to directly request communication from the UE2 only for App 1 and App2. Here, App 2 and App 3 are compatible, but if the PC5 NAS layer of UE 1 selects applications with strong security among compatible applications, the PC5 NAS layer of UE 1 can select a combination of App 1 and App 2 to which security is applied. In this case, for the PC5 NAS layer APP 3 of the UE 1, the application may be notified that a separate setting is required (e.g., connection setup needs to be done separately for APP 3).

3a~3b) The PC5 NAS layer of UE 1 may transmit a DCR (direct communication request) message to UE2, such that the PC5 NAS layer of UE 1 may start the setup of a new PC5 unicast link. In this process, UE 1 may transmit the following information to UE 2 (eg, the DCR message may include one or more of the following information):

Information on which applications use the PC5 unicast link to be set

Information on QoS requirements of each application

Information about each application's security policies

Upon receiving the DCR message from UE 1, UE 2 may determine the following based on information included in the DCR message (3b):

UE 2 may determine whether or not to configure a PC5 unicast link.

UE 2 may determine whether to use the PC unicast link for any application.

UE 2 may check the security policy for each application. And, UE 2 may determine which security policy to use.

UE 2 may determine what QoS will UE 2 provide for each application, and what QoS flow to set for each application, and which application is mapped for each QoS flow.

Additionally, for the same application, since the security policy of UE 1 and the security policy of UE 2 may be different, UE 2 may also check compatibility (compatibility) for each V2X app. For example, the security policy for App 2 of UE 1 is preferred, unlike UE1, UE2 may have a security policy of Not needed for App2. In this case, UE 2 may decide to reject App 2 for the PC5 unicast link configured with UE 1. Because, UE 1 requested to set up a PC5 unicast link with security applied to App 1 (Required) and App 2 (preferred), but the security policy for App 2 of UE 2 is Not required to which security is not applied. When rejecting in this way, the following step 4) and subsequent steps are not performed, instead, UE 2 may transmit a Direct Communication Reject message to UE 1. The Direct Communication Reject message may include the reason for rejecting because the security policy does not match.

4) UE 2 may decide to set up a PC5 unicast link according to the determination of step 3b). In this case, UE 2 may configure and transmit a Direct Communication Accept (DCA) message to UE 1 according to the determination of step 3b).

5) The PC5 NAS layer of each of UE 1 and UE 2 may deliver the following information to the PC5 RRC layer of each of UE 1 and UE 2:

Information on which QoS flow to set

Information on the QoS requirements of each QoS flow

Information on whether security is applied to each QoS Flow and algorithm information related to security 6) Based on the information in step 5), the PC5-RRC layer of UE1 and the PC5-RRC layer of UE2 may start configuring the AS layer (eg, RRC configuration). In this process (eg RRC configuration procedure), the following decisions may be performed:

The PC5-RRC layer of UE1 and the PC5-RRC layer of UE2 may determine how many side link radio bearers (SLRBs) to configure.

The PC5-RRC layer of UE1 and the PC5-RRC layer of UE2 may determine how security is applied to each SLRB.

The PC5-RRC layer of UE1 and the PC5-RRC layer of UE2 may determine which QoS flow is mapped. In this case, only QoS flows compatible with security application (eg, application of security policy) may be mapped to the same SLRB. For example, if ciphering is on in QoS Flow 1, and ciphering is off in QoS Flow 2, even their the QoS requirements are the same, they can be mapped to different SLRBs, 7) Through the PC5-RRC process (eg RRC configuration), when the AS setting is finished, UE2 (PC5 NAS layer of UE2) may transmit information that connection setup (eg, RRC configuration) is completed to App2 of UE2. Through the PC5-RRC process (eg RRC configuration), when the AS setting is finished, App 1 of UE 1 and App 1 of UE2 may transmit and receive data to each other. The process in which UE 2 informs App 1 that the connection establishment with UE 1 has been completed (eg, step 7) may be performed at any point in the process during steps 1) to 6) are performed.

5. Fifth Disclosure of the Present Specification

In the fifth disclosure of the present specification, content related to Quality of Service (QoS) Flow that can be applied to a combination of one or more of the first to fourth disclosures of the present specification described above will be described.

In a combination of one or more of the first to fourth disclosures of the present specification described above, each terminal may provide information related to security to a lower layer (eg, an AS layer) of the terminal. For example, each terminal may determine a configuration (or setting) for QoS Flow with the counterpart terminal. Then, each UE may inform the AS layer (eg, PC5-RRC layer) of the terminal of the information on the security policy applied to each configured (or set) QoS Flow. The AS layer of the terminal may know whether to apply security (eg, ciphering and/or integrity) to which QoS flow, based on the information on the security policy. Additionally, based on the information on the security policy, when the AS layer of the terminal configures (or sets) a sidelink radio bearer (SLRB), the AS layer of the terminal may map QoS flow to SLRB by considering security policy. For example, based on information about security policy, The AS layer of the terminal maps only QoS flows to which the same ciphering policy and/or integrity policy are applied to the same SLRB, and may map QoS flows having different ciphering policies and/or integrity policies to different SLRBs.

Based on this (eg, mapping), each UE may configure RRCconfigurationSidelink information. And, the PC5-RRC of each terminal may exchange RRCconfigurationSidelink information with each other. Here, the RRCconfiguration-Sidelink information may be information for establishing an RRC connection for Sidelink communication. The RRCco-nfigurationSidelink information may include information on mapping between QoS flow and SLRB. The UE may check the QoS flow and SLRB mapping of the counterpart UE. After the UE examines the QoS flow and SLRB mapping, the UE may confirm that QoS flows to which different ciphering policies and/or integrity policies are applied are mapped to the same SLRB. In this case, the terminal receiving the RRCconfigurationSidelink information may reject the reconfiguration (or configuration), or may release the PC5 link. The terminal may notify the counterpart terminal that a security configuration failure has occurred in this process (e.g., the process of rejecting reconfiguration (or configuration) or the process of releasing the PC5 link).

Hereinafter, an example of a procedure to which the contents described in the fifth disclosure of the present specification are applied will be described with reference to FIG. 11.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
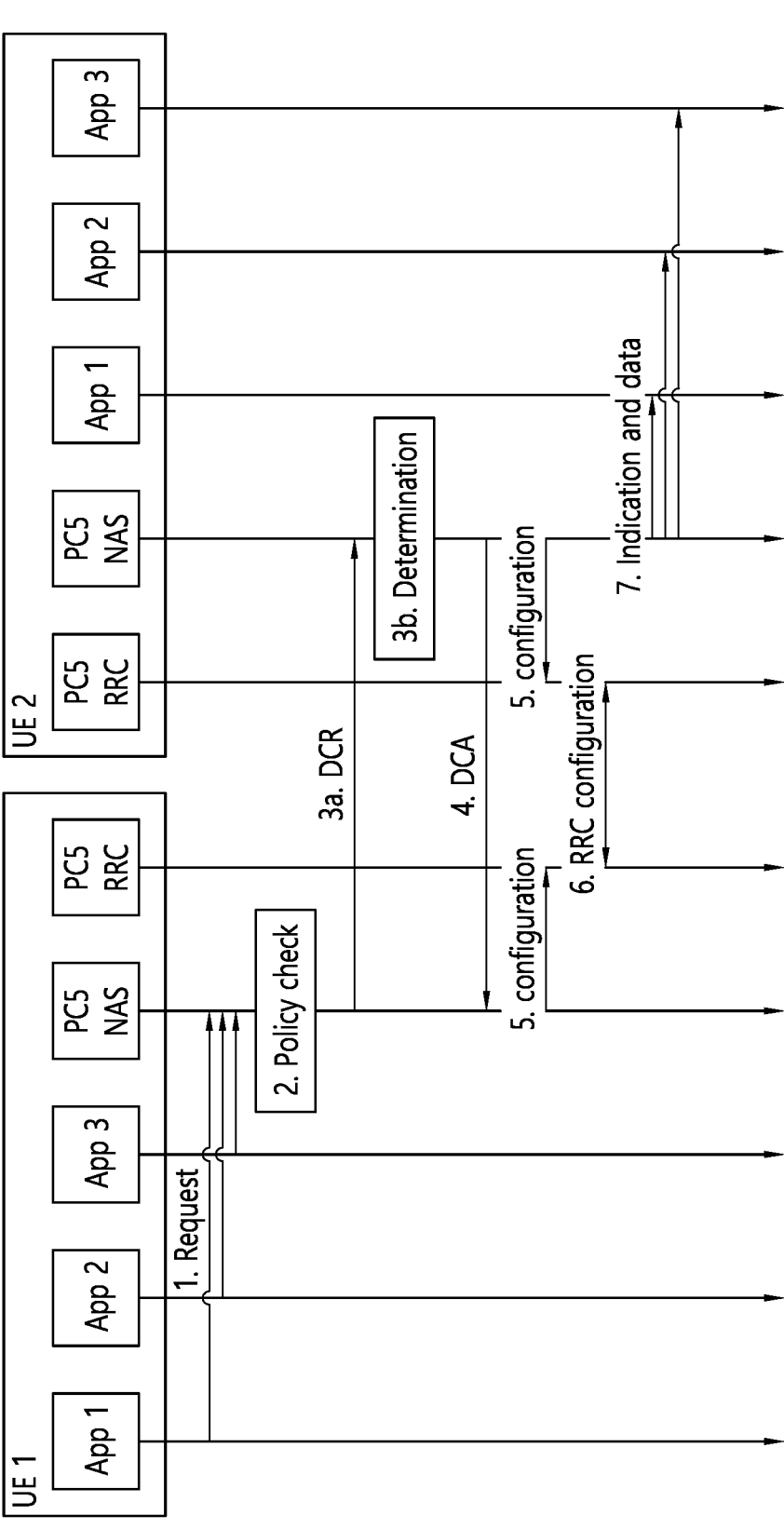
FIG. 11 shows an example of a procedure according to the fifth disclosure of the present specification.

FIG. 11 shows an example of a procedure according to the fifth disclosure of the present specification.

The operations of UE 1 and UE 2 shown in the example of FIG. 11 are merely examples, and the scope of the disclosure is not limited thereto. UE 1 and UE 2 may perform the operation of the UE described in the disclosure of this specification, even if the operation is not shown in the example of FIG. 11.

In the example of FIG. 11, UE 1 may include an application layer. The application layer of UE 1 may include App 1 (Application 1), App 2, and App 3. UE 1 may include a plurality of application layers, and each of App 1, App 2, and App 3 may be included in a separate application layer. And each application may include one or more V2X services.

1) In the application layer of UE 1, data exchange with UE 2 may be started. To this end, the application layer of UE 1 may request a connection setup from the PC5 NAS layer.

2) The PC5 NAS layer of UE1 may check the QoS requirements of applications requesting connection and each security policy.

3a~3b) The PC5 NAS layer of UE 1 may transmit a DCR (direct communication request) message to UE2, such that the PC5 NAS layer of UE 1 may start the setup of a new PC5 unicast link. In this process, UE 1 may transmit the following information to UE 2 (eg, the DCR message may include one or more of the following information):

Information on which applications use the PC5 unicast link to be set

Information on QoS requirements of each application

Information about each application's security policies

Upon receiving the DCR message from UE 1, UE 2 may determine the following based on information included in the DCR message (3b):

UE 2 may determine whether or not to configure a PC5 unicast link.

UE 2 may determine whether to use the PC unicast link for any application.

UE 2 may check the security policy for each application. And, UE 2 may determine which security policy to use.

UE 2 may determine what QoS will UE 2 provide for each application, and what QoS flow to set for each application, and which application is mapped for each QoS flow.

4) UE 2 may decide to set up a PC5 unicast link according to the determination of step 3b). In this case, UE 2 may configure and transmit a Direct Communication Accept (DCA) message to UE 1 according to the determination of step 3b).

5) The PC5 NAS layer of each of UE 1 and UE 2 may deliver the following information to the PC5 RRC layer of each of UE 1 and UE 2:

Information on which QoS flow to set

Information on the QoS requirements of each QoS flow

Information on whether security is applied to each QoS Flow and algorithm information related to security 6) Based on the information in step 5), the PC5-RRC layer of UE1 and the PC5-RRC layer of UE2 may start configuring the AS layer (eg, RRC configuration). In this process (eg RRC configuration procedure), the following decisions may be performed:

The PC5-RRC layer of UE1 and the PC5-RRC layer of UE2 may determine how many side link radio bearers (SLRBs) to configure.

The PC5-RRC layer of UE1 and the PC5-RRC layer of UE2 may determine how security is applied to each SLRB.

The PC5-RRC layer of UE1 and the PC5-RRC layer of UE2 may determine which QoS flow is mapped. In this case, only QoS flows compatible with security application (eg, application of security policy) may be mapped to the same SLRB. For example, if ciphering is on in QoS Flow 1, and ciphering is off in QoS Flow 2, even their the QoS requirements are the same, they can be mapped to different SLRBs, 7) Through the PC5-RRC process (eg RRC configuration), when the AS setting is finished, UE2 (PC5 NAS layer of UE2) may transmit information that connection setup (eg, RRC configuration) is completed to App2 of UE2. Through the PC5-RRC process (eg RRC configuration), when the AS setting is finished, App 1 of UE 1 and App 1 of UE2 may transmit and receive data to each other. The process in which UE 2 informs App 1 that the connection establishment with UE 1 has been completed (eg, step 7) may be performed at any point in the process during steps 1) to 6) are performed.

Hereinafter, descriptions applicable to various examples described with reference to the first disclosure of the present specification to the fifth disclosure of the present specification will be described with reference to the example of FIG. 12 and the example of FIG. 13.

An example of a PC5 unicast link establishment procedure initiated by an initiating UE according to the disclosure of the present specification will be described with reference to the example of FIG. 12.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
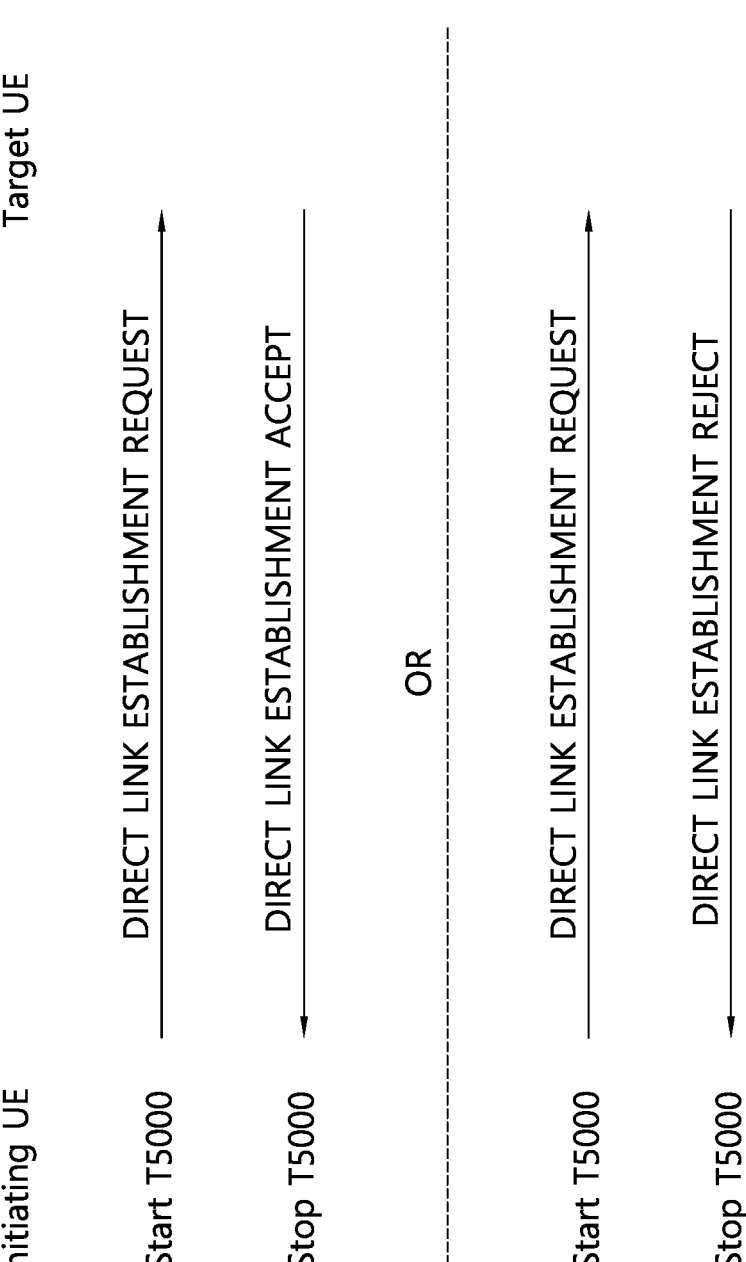
FIG. 12 shows an example of a PC5 unicast link establishment procedure according to the disclosure of the present specification.

FIG. 12 shows an example of a PC5 unicast link establishment procedure according to the disclosure of the present specification.

Before starting the PC5 unicast link establishment procedure, the initiating UE may satisfy the pre-condition as in the following example. For example, the initiating UE may start the PC5 unicast link establishment procedure when the pre-condition as in the following example is satisfied:

a) a request from a higher layer to transmit a packet for V2X service through PC5;

b) the communication mode is unicast mode (eg, the communication mode is preset to unicast mode, or it is indicated by the upper layer that the communication mode is unicast mode).

c) a link layer identifier (eg, a layer-2 ID used for unicast communication) for the initiating UE is available (eg, a link layer identifier is preset or self-assigned), not used by other existing PC5 unicast links within the initiating UE;

d) a link layer identifier (Example: destination layer-2 ID used for unicast initial signaling) for unicast initial signaling is available for the initiating UE (Example: Link layer identifier is preset, obtained, or known through previous V2X communication);

NOTE 1: When different V2X services are mapped to a separate default destination layer-2 ID, when the initiating UE wants to configure (or establish) a single unicast link that can be used for one or more V2X service types, the UE may select one of the default destination layer-2 IDs for unicast initial signaling.

e) when the initiating UE is authorized (authorized) for V2X communication through PC5 in NR-PC5 of the serving PLMN, or when the initiating UE is not served by E-UTRA and is not served by NR when it has a valid authorization for V2X communication through PC5 in NR-PC5;

f) There is no existing PC5 unicast link to the peer application layer ID pair, or there is an existing PC5 unicast link to the peer application layer ID pair, if the following conditions are also met:

1) If the network layer protocol of the existing PC5 unicast link does not match the network layer protocol required for the upper layer of the initiating UE for this V2X service; or 2) When the security policy (eg, signaling security policy or user plane security policy) corresponding to this V2X service identifier is not compatible with the security policy of the existing PC5 unicast link; and g) When the number of established PC5 unicast links is less than the implementation-specific maximum number of established NR PC5 unicast links allowed at one time in the UE.

For reference, among the pre-conditions described above, 2) of f) may be related to the third example of the first disclosure of the present specification. For example, in the third example of the first disclosure of the present specification, when the security policy of the V2X service newly requested by the UE 1 and the security policy of the unicast PC5 link are not compatible, UE 1 may configure (or establish) a new unicast PC5 link for V2X services compatible with the security policy. In the third example of the first disclosure of the present specification, this operation of the UE 1 may correspond to 2) of f) among the above-described pre-conditions.

After the initiating UE receives the service data or request from the upper layer, the initiating UE may derive PC5 QoS parameters and allocate PQFI(s) for PC5 QoS flow(s) to be configured (or established).

To start the PC5 unicast link establishment (or configuration) procedure, the initiating UE may generate a DIRECT LINK ESTABLISHMENT REQUEST message. The initiating UE may perform operations such as the following examples:

a) the initiating UE may include the source user information set as the application layer ID of the initiating UE received from the upper layer in the DIRECT LINK ESTABLISHMENT REQUEST message;

b) the initiating UE may include the V2X service identifier received from the upper layer in the DIRECT LINK ESTABLISHMENT REQUEST message;

c) When the target user information is received from the upper layer, the initiating UE may include the target user information set as the application layer ID of the target UE in the DIRECT LINK ESTABLISHMENT REQUEST message;

d) When the UE PC5 unicast signaling integrity protection policy is set to "Require signaling integrity protection" or "Prefer signaling integrity protection", the initiating UE may include a key establishment information container in the DIRECT LINK ESTABLISHMENT REQUEST message. And, if the signaling integrity protection policy is set to "Signaling integrity protection is not required", the initiating UE may include the key establishment information container in the DIRECT LINK ESTABLISHMENT REQUEST message.

NOTE 2: The key establishment information container may be provided by a higher layer.

e) if the UE PC5 unicast signaling integrity protection policy is set to "Require signaling integrity protection" or "Prefer signaling integrity protection", for establishing (or establishing) a session key over this PC5 unicast link, the initiating UE may include Nonce_1 set to the 128-bit nonce value generated by the initiating UE in the LINK ESTABLISHMENT REQUEST message;

f) for the security establishment (or establishment) of this PC5 unicast link, the initiating UE may include the UE security function indicating the list of algorithms supported by the initiating UE in the LINK ESTABLISHMENT REQUEST message;

g) If the UE PC5 unicast signaling integrity protection policy is set to "Signaling Integrity Protection REQUIRED" or "Signaling Integrity Protection PREFERRED", the initiating UE may include 8 MSB of the $K_{NRP\text{-}sess}$ ID selected by the initiating UE in the LINK ESTABLISHMENT REQUEST message;

h) If the initiating UE has an existing $K_{NRP}$ for the target UE, the initiating UE may include the KNRP ID in the LINK ESTABLISHMENT REQUEST message; and i) The initiating UE may include the UE PC5 unicast signaling security policy in the LINK ESTABLISHMENT REQUEST message. When different V2X services are mapped to different PC5 unicast signaling security policies, when the initiating UE wants to configure (or establish) a single unicast link that can be used for one or more V2X services, each of the signaling security policies of these V2X services must be compatible with each other. For example, "signaling integrity protection is not required" and "signaling integrity protection is required" may be interpreted as incompatible with each other.

After the DIRECT LINK ESTABLISHMENT REQUEST message is generated, the initiating UE may forward this message to the lower layer. The initiating UE may transmit a DIRECT LINK ESTABLISHMENT REQUEST message together with layer-2 ID of initiating UE for unicast communication, destination layer-2 ID used for unicast initial signaling, and start timer T5000, to a lower layer for transmission. Here, the timer T5000 may be a timer used in V2X communication. The default value of T5000 may be 300s, and other values may be used as timer values. While T5000 is running, the initiating UE does not send a new DIRECT LINK ESTABLISHMENT REQUEST message to the same target UE identified by the same application layer ID.

NOTE 3: To ensure successful PC5 unicast link establishment, T5000 can be set to a value greater than the sum of T5006 and T5007.

Hereinafter, the PC5 unicast link security mode control procedure accepted by the target UE of FIG. 12 will be described.

The target UE may receive a DIRECT LINK SECURITY MODE COMMAND message from the initiating UE. When the target UE receives the DIRECT LINK SECURITY MODE COMMAND message, if the PC5 unicast link security mode control procedure is triggered during the PC5 unicast link configuration (or establishment) procedure, the target UE may check whether the 8 LSB of the $K_{NPR\text{-}sess}$ ID included in the DIRECT LINK SECURITY is set to the same value as the value received from the other UE. Here, the value received from another UE is a response to the DIRECT LINK ESTABLISHMENT REQUEST message sent by the target UE, it may mean the 8 LSB value of the $K_{NPR\text{-}sess}$ ID transmitted by another UE to the target UE. The target UE may perform an operation as in the following example:

a) The target UE may derive $K_{NRP\text{-}sess}$ from $K_{NRP}$, Nonce_1 and Nonce_2 received in the DIRECT LINK SECURITY MODE COMMAND message.

b) The target UE may derive NRPEK and NRPIK from $K_{NRP\text{-}sess}$ and security algorithms.

The target UE may determine whether to accept the DIRECT LINK SECURITY MODE COMMAND message based on the following:

a) The target UE may use NRPIK to check the integrity of the DIRECT LINK SECURITY MODE COMMAND message;

b) the target UE may confirm that the received UE security capability is not changed by comparing it with the value sent to the initiating UE in the DIRECT LINK ESTABLISHMENT REQUEST message or the DIRECT LINK REKEYING REQUEST message;

c) If the PC5 unicast link security mode control procedure is triggered during the PC5 unicast link configuration (or establishment) procedure, 1) The target UE may check whether the received UE PC5 unicast signaling security policy has not been changed by comparing it with the value sent by the target UE to the initiating UE in the DIRECT LINK ESTABLISHMENT REQUEST message; and 2) If the target UE's PC5 unicast signaling integrity protection policy is set to "Signaling integrity protection is required", the target UE may check whether the security algorithm selected in the DIRECT LINK SECURITY MODE COMMAND message does not include a null integrity protection algorithm; and d) PC5 unicast link security mode control procedure is triggered during PC5 unicast link re-keying procedure, if the current integrity protection algorithm using for PC5 unicast links is different from the null integrity protection algorithm, the target UE may check that the selected security algorithm in the DIRECT LINK SECURITY MODE COMMAND message does not include a null integrity protection algorithm.

If the target UE does not include the $K_{NRP}$ ID in the DIRECT LINK ESTABLISHMENT REQUEST message, the target UE has included a re-authentication indication in the DIRECT LINK REKEYING REQUEST message, or if the initiating UE chooses to derive a new $K_{NRP}$, the target UE may derive $K_{NRP}$. To ensure that the resulting $K_{NRP}$ ID will be unique in the target UE, the target UE may select 16 LSBs of the $K_{NRP}$ ID. The target UE forms a $K_{NRP}$ ID from the MSB of the received $K_{NRP}$ ID and the selected LSB of the $K_{NRP}$ ID, the target UE may store the complete $K_{NRP}$ ID together with the $K_{NRP}$.

If the target UE accepts the DIRECT LINK SECURITY MODE COMMAND message, the target UE may generate a DIRECT LINK SECURITY MODE COMPLETE message. For the DIRECT LINK SECURITY MODE COMPLETE message, the target UE may perform the following actions:

a) the target UE may include the PQFI and corresponding PC5 QoS parameters in the DIRECT LINK SECURITY MODE COMPLETE message;

b) When IP communication is used, the target UE may include an IP address configuration IE (Information Element) set to one of the following values in the DIRECT LINK SECURITY MODE COMPLETE message:

1) "IPv6 router", if the IPv6 address allocation mechanism is supported by the target UE (eg, when the target UE acts as an IPv6 router); or 2) if the target UE does not support IPv6 address allocation mechanism, "IPv6 address allocation not supported";

c) If IP communication is used and IP address setting IE is set to "IPv6 address assignment is not supported", the target UE may include the locally formed link-local IPv6 address IE in the DIRECT LINK SECURITY MODE COMPLETE message;

d) when a new $K_{NRP}$ is derived, the target UE may include 16 LSBs of the $K_{NRP}$ ID in the DIRECT LINK SECURITY MODE COMPLETE message; and e) When the PC5 unicast link security mode control procedure is triggered during the PC5 unicast link establishment (or establishment) procedure, the target UE may include the UE PC5 unicast user plane security policy for this PC5 unicast link in the DIRECT LINK SECURITY MODE COMPLETE message. When different V2X services are mapped to different PC5 unicast user plane security policies, if more than one V2X service identifier is included in the DIRECT LINK ESTABLISHMENT REQUEST message, each user plane security policy of the corresponding V2X service must be compatible with the following. For example, "user plane integrity protection is not required" and "user plane integrity protection is required" may be interpreted as incompatible with each other.

The target UE derives the $K_{NPR\text{-}sess}$ ID from the 8 LSB of the received $K_{NPR\text{-}sess}$ ID, based on the 8 MSB of the $K_{NPR\text{-}sess}$ ID transmitted in the DIRECT LINK ESTABLISHMENT REQUEST message or the DIRECT LINK REKEYING REQUEST message and based on the DIRECT LINK SECURITY MODE COMMAND message.

The target UE may cipher and integrity-protect the DIRECT LINK SECURITY MODE COMPLETE message with a new security context.

After the DIRECT LINK SECURITY MODE COMPLETE message is generated, for transmission, the target UE may deliver the DIRECT LINK SECURITY MODE COMPLETE message, together with the layer-2 ID of the target UE for unicast communication and the layer-2 ID of the initiating UE for unicast communication, to the lower layer.

In the following, in the disclosure of the present specification (eg, including various examples of the first disclosure of the present specification to the fifth disclosure of the present specification), examples of operations of terminals (eg, UE 1 and UE 2) based on descriptions according to various drawings and tables will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
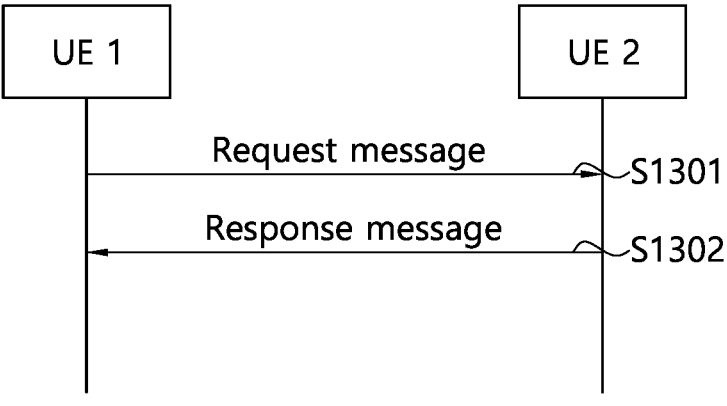
FIG. 13 shows an example of the operation of the terminal according to the disclosure of the present specification.

FIG. 13 shows an example of the operation of the terminal according to the disclosure of the present specification.

For reference, the operation of the terminal (eg, UE 1 and UE 2) shown in FIG. 13 is only an example, even though the operation is not shown in FIG. 13, the operation of the terminal according to the disclosure of the present specification described above through various examples may be performed.

In step S1301, UE 1 may transmit a request message to UE 2.

Here, the request message may be transmitted for UE 1 to establish a unicast link. The request message may be a message requesting to establish one unicast link for a plurality of V2X services. The request message may include information related to the V2X service and information related to the security policy of the V2X service. For example, when UE 1 requests to establish a unicast link for a plurality of V2X services, the request message may include information related to security policies of a plurality of V2X services. Here, each of the security policies of the plurality of V2X services may be compatible with each other.

The request message may include information related to the strongest security policy among the security policies of a plurality of V2X services.

In step S1302, UE 2 may transmit a response message to UE 1. UE 2 may generate a response message based on information related to security policies transmitted by UE 1.

For example, UE 2 may determine whether to accept or reject each of the plurality of V2X services, by comparing the security policies of UE 1 for a plurality of V2X services and the security policies of UE 2 for a plurality of V2X services. As an example, the response message may include a list of V2X services accepted by UE 2 because the security policy is compatible among a plurality of V2X services and/or may include a list of V2X services rejected by the UE 2 because the security policy is not compatible among the plurality of V2X services.

For example, the response message may include information related to the security policy of the UE 2 for each of a plurality of V2X services.

Here, the response message may be, for example, a Direct Communication Accept message.

UE 1 may transmit information related to application of at least one security policy among the security policies of a plurality of V2X services to a lower layer of UE 1 based on that the response message is received.

UE 1 and UE 2 may configure one or more QoS flows based on the security policies of a plurality of V2X services. Further, UE 1 and/or UE 2 may map one or more QoS flows to one or more SLRBs. The same security policy may be applied to at least one QoS flow mapped to one or more SLRBs.

As described in the disclosure of the present specification, direct communication (eg, V2X communication) between terminals in a mobile communication system can be effectively supported. For example, as described in the disclosure of the present specification, a security policy can be effectively applied in V2X communication. For example, for V2X services with one or more security policies, security can be effectively applied.

As described in the disclosure of this specification, in the process of establishing a first direct communication connection (eg, unicast PC5 link) for a plurality of services, the terminal may examine a security setting value (eg, a security policy) for each service. The terminal selects only those services with compatible security settings among these services, the terminal may including those services with compatible security settings in the direct communication connection request message, and may transmit the direct communication connection request message to the counterpart terminal. When the terminal receives a direct communication connection request response message from the other terminal, the terminal may perform an additional configuration process for the list of services for which configuration is allowed within the response message. The terminal may notify the upper application of the terminal that the security settings are not compatible, for services whose settings were rejected due to differences in security settings within this response message.

For reference, the operation of the UE described in the present disclosure may be implemented by the devices of FIGS. 1 to 3 described above. For example, a terminal (e.g., UE) may be the first device 100 or the second device 200 of FIG. 1. For example, the operation of a terminal (e.g., UE) described in the present disclosure may be processed by one or more processors 102 or 202. The operation of the terminal described in the present disclosure may be stored in one or more memories 104 or 204 in the form of an instruction/ program (e.g., instruction and executable code) executable by the one or more processors 102 or 202. The one or more processors 102 or 202 may control the one or more memories 104 or 204 and one or more transceivers 105 or 206 and execute instructions/programs stored in the one or more memories 104 or 204 to perform the operation of a terminal (e.g., UE) described in the present disclosure.

In addition, instructions for performing the operation of a terminal (e.g., UE) described in the present disclosure may be stored in a non-volatile computer-readable storage medium. The storage medium may be included in the one or more memories 104 or 204. In addition, the instructions recorded in the storage medium may be executed by the one or more processors 102 or 202 to perform the operation of a terminal (e.g., UE) described in the present disclosure.

Although preferred embodiments have been described above, the present disclosure is not limited to such specific embodiments and thus can be modified, changed, or improved in various manners within the spirt of the present disclosure and the scope of the claims.

Although methods are described as a series of steps or blocks based on a flowchart in the exemplary system described above, they are not limited to the order of the described steps, and some steps may occur in a different order or simultaneously with other steps as described above. In addition, those skilled in the art will understand that the steps shown in the flowchart are not exclusive, and that other steps may be included or that one or more steps of a flowchart may be deleted without affecting the scope of rights.

The claims described herein may be combined in various ways. For example, the technical features of the method claims of the present disclosure may be combined and implemented as an apparatus, and the technical features of the apparatus claims of the present disclosure may be combined and implemented as a method. In addition, the technical features of the method claims of the present disclosure and the technical features of the apparatus claims may be combined and implemented as an apparatus, and the technical features of the method claims of the present disclosure and the technical features of the apparatus claims may be combined and implemented as a method.

What is claimed is:

1. A method, comprising:

transmitting, by a first user equipment (UE), to a second UE, a direct link establishment request message; and receiving, by the first UE, from the second UE, a direct link establishment accept message, based on the direct link establishment request message, wherein the direct link establishment request message includes one or more vehicle-to-everything (V2X) service identifiers and one or more security policies, wherein, in a case where V2X services are mapped to security policies, when the first UE intends to establish a single unicast link that can be used for the V2X services, each of the security policies of the V2X services is compatible with one another, and wherein a security policy of signalling integrity protection not needed and a security policy of signalling integrity protection required are not compatible.

2. The method of claim 1, further comprising:

transmitting, by the first UE, to a lower layer of the first UE, based on that the direct link establishment accept message has been received, information related to application of at least one of the security policies of the at least one of the V2X services.

3. The method of claim 1, wherein the direct link establishment accept message is a direct communication accept message.

4. The method of claim 1, wherein, based on that at least one of the security policies of the V2X services is compatible, the direct link establishment accept message includes a list of at least one of the V2X services accepted by the second UE.

5. The method of claim 1, wherein the direct link establishment accept message includes one or more security policies of the second UE for each of the V2X services.

6. The method of claim 1, wherein the security policy is a unicast signaling security policy of the first UE.

7. The method of claim 1, further comprising:

establishing, by the first UE, based on that each of the security policies of the V2X services is compatible, one or more quality of service (QoS) flows with the second UE.

8. The method of claim 7, further comprising:

mapping, by the first UE, the one or more QoS flows to one or more sidelink radio bearers (SLRBs), wherein, for at least one QoS flow mapped to the one or more SLRBs, same security policy is applied.

9. The method of claim 1, wherein the case where the V2X services are mapped to the security policies is a case where different V2X services are mapped to different security policies.

10. A first user equipment (UE), comprising:

at least one transceiver;

at least one processor; and at least one memory connected to the at least one processor and storing instructions that, based on being executed by the at least one processor, cause the first UE to perform operations comprising:

transmitting, to a second UE, a direct link establishment request message; and receiving, from the second UE, a direct link establishment accept message, based on the direct link establishment request message, wherein the direct link establishment request message includes one or more vehicle-to-everything (V2X) service identifiers and one or more security policies, wherein, in a case where V2X services are mapped to security policies, when the first UE intends to establish a single unicast link that can be used for the V2X services, each of the security policies of the V2X services is compatible with one another, and wherein a security policy of signalling integrity protection not needed and a security policy of signalling integrity protection required are not compatible.

11. The first UE of claim 10, wherein the at least one memory connected to the at least one processor and storing the instructions that, based on being executed by the at least one processor, cause the first UE to perform the operations further comprising:

transmitting, to a lower layer of the first UE, based on that the direct link establishment accept message has been received, information related to application of at least one of the security policies of the at least one of the V2X services.

12. The first UE of claim 10, wherein the direct link establishment accept message is a direct communication accept message.

13. The first UE of claim 10, wherein, based on that at least one of the security policies of the V2X services is compatible, the direct link establishment accept message includes a list of at least one of the V2X services accepted by the second UE.

14. The first UE of claim 10, wherein the direct link establishment accept message includes one or more security policies of the second UE for each of the V2X services.

15. The first UE of claim 10, wherein the direct link establishment request message includes the strongest security policy among the security policies of the V2X services.

16. The first UE of claim 10, wherein the first UE is an autonomous driving device communicating with at least one of a mobile terminal, a network, and an autonomous vehicle other than the first UE.

17. A processing device, comprising:

at least one processor; and at least one memory connected to the at least one processor and storing instructions that, based on being executed by the at least one processor, cause a first user equipment (UE) to perform operations comprising:

transmitting, to a second UE, a direct link establishment request message; and receiving, from the second UE, a direct link establishment accept message, based on the direct link establishment request message, wherein the direct link establishment request message includes one or more vehicle-to-everything (V2X) service identifiers and one or more security policies, wherein, in a case where V2X services are mapped to security policies, when the first UE intends to establish a single unicast link that can be used for the V2X services, each of the security policies of the V2X services is compatible with one another, and wherein a security policy of signalling integrity protection not needed and a security policy of signalling integrity protection required are not compatible.

* * * * *